(12) United States Patent
Kim et al.

(10) Patent No.: US 10,509,560 B2
(45) Date of Patent: Dec. 17, 2019

(54) ELECTRONIC DEVICE HAVING FLEXIBLE DISPLAY AND METHOD FOR OPERATING THE ELECTRONIC DEVICE

(71) Applicant: Samsung Electronics Co., Ltd, Gyeonggi-do (KR)

(72) Inventors: Chul-Woo Kim, Gyeonggi-do (KR); Sung-Youn An, Gyeonggi-do (KR); Hang-Kyu Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 15/384,279

(22) Filed: Dec. 19, 2016

(65) Prior Publication Data

US 2017/0185289 A1 Jun. 29, 2017

(30) Foreign Application Priority Data

Dec. 28, 2015 (KR) ........................ 10-2015-0187313

(51) Int. Cl.
*G06F 3/0488* (2013.01)
*G06F 1/16* (2006.01)

(52) U.S. Cl.
CPC ........ *G06F 3/04886* (2013.01); *G06F 1/1626* (2013.01); *G06F 1/1641* (2013.01);
(Continued)

(58) Field of Classification Search
CPC .. G06F 3/04886; G06F 1/1641; G06F 1/1643; G06F 1/1652; G06F 2203/04802
See application file for complete search history.

(56) References Cited

U.S. PATENT DOCUMENTS

| 2008/0212272 A1 | 9/2008 | Hollander |
| 2009/0189865 A1 | 7/2009 | Mishra |

(Continued)

FOREIGN PATENT DOCUMENTS

| EP | 2202624 A2 | 6/2010 |
| EP | 2669771 A1 | 12/2013 |

(Continued)

OTHER PUBLICATIONS

European Patent Office, "Supplementary European Search Report," Application No. EP16881976.1, dated Jul. 27, 2018, 8 pages.

(Continued)

*Primary Examiner* — Stephen S Hong
*Assistant Examiner* — Ahamed I Nazar

(57) ABSTRACT

An electronic device having a flexible display and a method for operating the same are provided. The method includes displaying a first graphic user interface (GUI) for character input on a flexible display and detecting a change in a bending state of the flexible display. Changing the first GUI to a second GUI based on the detected change of the bending state of the flexible display, and then displaying the second GUI. In some embodiments, the method may include determining a moved area among the first area and the second area and displaying the second GUI based on the determined moved area and the angle between the first area and the second area. Determining the moved area may include detecting a first pressure corresponding to the first area and a second pressure corresponding to the second area, and then determining the moved area based on the first and second pressures.

17 Claims, 31 Drawing Sheets

(52) U.S. Cl.
CPC .......... G06F 1/1643 (2013.01); G06F 1/1652 (2013.01); *G06F 2203/04802* (2013.01)

(56) References Cited

U.S. PATENT DOCUMENTS

| | | |
|---|---|---|
| 2009/0303200 A1 | 12/2009 | Grad |
| 2010/0141605 A1 | 6/2010 | Kang et al. |
| 2013/0127918 A1* | 5/2013 | Kang .................... G06F 3/0481 345/660 |
| 2013/0265221 A1* | 10/2013 | Lee .......................... G06F 3/01 345/156 |
| 2013/0300668 A1 | 11/2013 | Churikov et al. |
| 2014/0015743 A1* | 1/2014 | Seo ....................... G06F 1/1694 345/156 |
| 2014/0055429 A1* | 2/2014 | Kwon .................... G09G 3/001 345/204 |
| 2014/0118317 A1* | 5/2014 | Song .................... G06F 1/1652 345/204 |
| 2014/0152553 A1* | 6/2014 | Cha ........................ G06F 3/013 345/156 |
| 2015/0022472 A1 | 1/2015 | Jung et al. |
| 2015/0042674 A1* | 2/2015 | Lin .......................... G09G 5/14 345/619 |
| 2015/0153778 A1 | 6/2015 | Jung |

FOREIGN PATENT DOCUMENTS

| | | |
|---|---|---|
| EP | 2709091 A2 | 3/2014 |
| EP | 2958006 A1 | 12/2015 |

OTHER PUBLICATIONS

Foreign Communication from Related Counterpart Application, PCT Application No. PCT/KR2016/014035, International Search Report dated Mar. 3, 2017, 3 pages.

Foreign Communication from Related Counterpart Application, PCT Application No. PCT/KR2016/014035, Written Opinion of the International Searching Authority dated Mar. 3, 2017, 8 pages.

\* cited by examiner 824 
825

826 
827

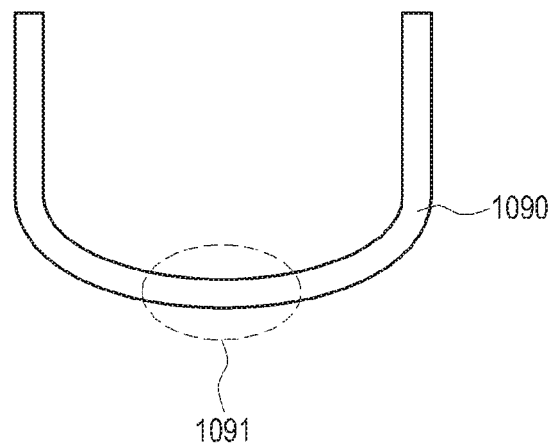
FIG.10J
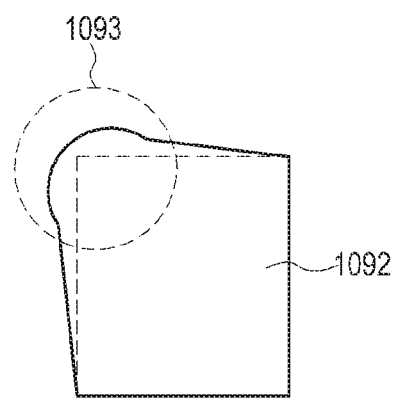 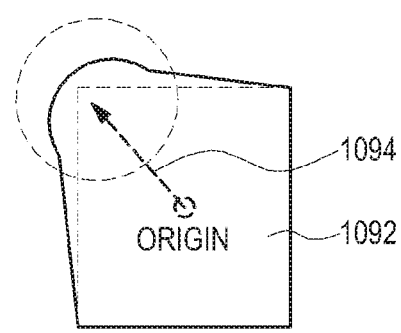
FIG.10K   FIG.10L

ELECTRONIC DEVICE HAVING FLEXIBLE DISPLAY AND METHOD FOR OPERATING THE ELECTRONIC DEVICE

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Dec. 28, 2015 and assigned Serial No. 10-2015-0187313, the entire disclosure of which is incorporated herein by reference.

TECHNICAL FIELD

The present disclosure relates generally to an electronic device and a method for operating the electronic device; and more particularly, to an electronic device having a flexible display and a method for operating the electronic device.

BACKGROUND

These days, technologies related to flexible displays which are bendable by an external force are under active development. A flexible display may be temporarily bent or kept bent by a force applied to it. Therefore, a user may view screens of various sizes on the display according to the user's preferences.

The user may manipulate the display to an intended shape and use the display in the shape. Particularly, the flexible display may include a touch panel and the user may apply an input to the display manipulated to the intended shape. A conventional flexible display provides the same interface for input even though the display is changed in shape. Accordingly, if the shape of the conventional flexible display is changed, the user may have difficulty in applying an input to the display.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an electronic device and a method for operating the same, which can change a graphic user interface (GUI) for character input according to a change in the shape of a flexible display and display the changed GUI on the flexible display.

In accordance with an embodiment of the present disclosure, there is provided a method for operating an electronic device having a flexible display. The method includes displaying a first GUI for character input on the flexible display, detecting a change in a bending state of the flexible display, and changing the first GUI to a second GUI in correspondence with the change of the bending state of the flexible display, and displaying the second GUI.

In accordance with another embodiment of the present disclosure, there is provided an electronic device. The electronic device includes a flexible display for displaying a first GUI for character input, a processor connected electrically to the flexible display, and a memory connected electrically to the processor. The memory stores an instruction which, when executed, controls the processor to detect a change in a bending state of the flexible display, and to change the first GUI to a second GUI in correspondence with the change of the bending state of the flexible display, and display the second GUI.

Other embodiments, aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A to 10L are views illustrating or describing measurement of bending states of an electronic device according to various embodiments of the present disclosure;

Throughout the drawings, like reference numerals will be understood to refer to like parts, components, and structures.

DETAILED DESCRIPTION

Figure 1:
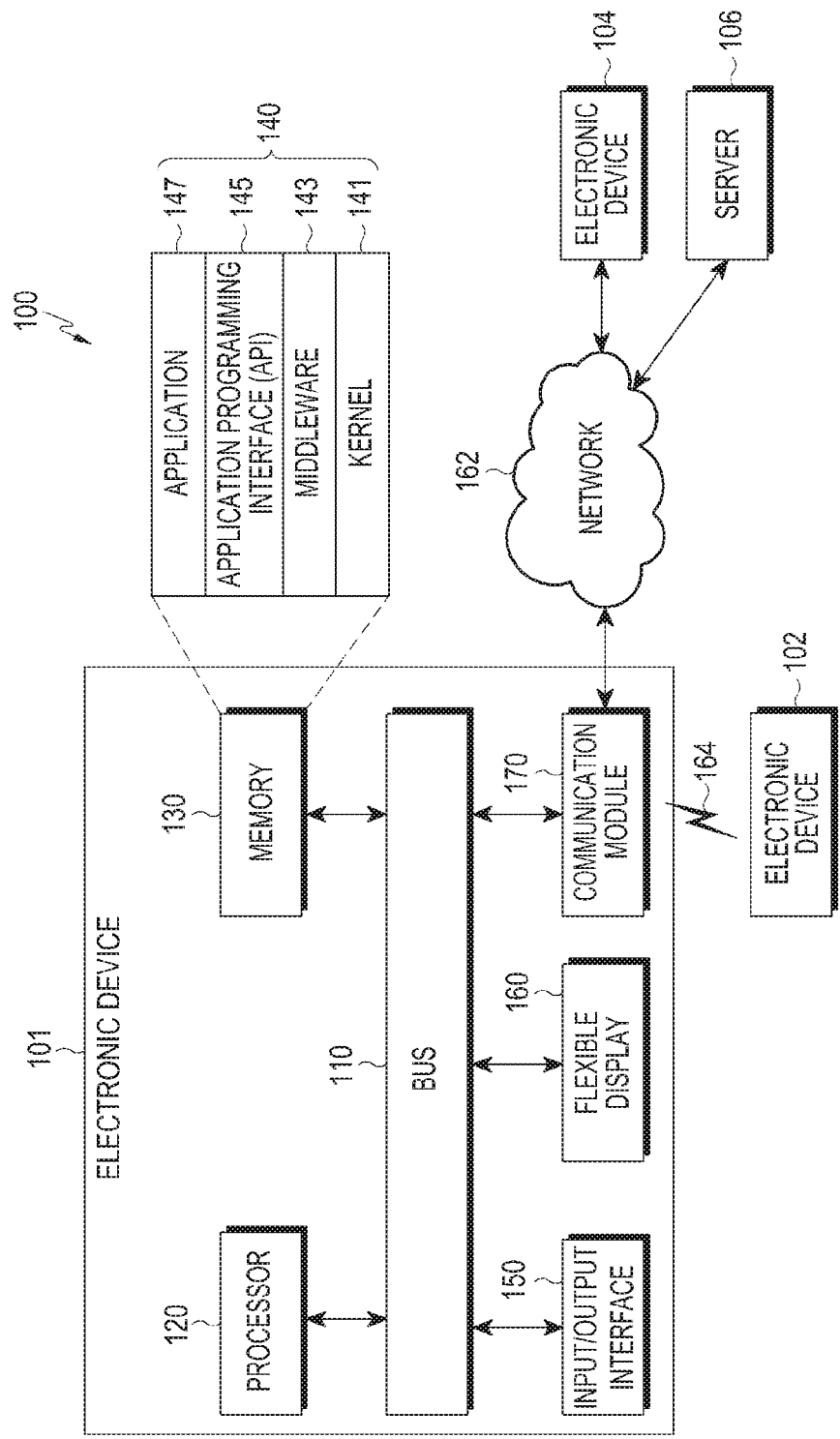
FIG. 1 illustrates a block diagram of an electronic device and a network according to various embodiments of the present disclosure.

FIGS. 1 through 22E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various embodiments of the present disclosure are described with reference to the accompanying drawings. However, the scope of the present disclosure is not intended to be limited to the particular embodiments and it is to be understood that the present disclosure covers all modifications, equivalents, and/or alternatives falling within the scope and spirit of the present disclosure. In relation to a description of the drawings, like reference numerals denote the same components.

In the present disclosure, the term 'have', 'may have', 'include', or 'may include' signifies the presence of a specific feature (for example, number, function, operation, or component such as part), not excluding the presence of one or more other features.

In present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance. These expressions are used to distinguish one component from another component, not limiting the components. For example, a first user equipment (UE) and a second UE may indicate different UEs irrespective of sequence or importance. For example, a first component may be referred to as a second component and vice versa without departing from the scope of the present disclosure.

When it is said that a component (for example, a first component) is '(operatively or communicatively) coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may be 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

An electronic device according to various embodiments of the present disclosure may be at least one of, for example, a smartphone, a tablet personal computer (PC), a mobile phone, a video phone, an e-book reader, a desktop PC, a laptop PC, a netbook computer, a workstation, a server, an personal digital assistant (PDA), a portable multimedia player (PMP), an MP3 player, a mobile medical equipment, a camera, or a wearable device. According to various embodiments, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), a body-attached type (for example, a skin pad or a tattoo), or an implantable type (for example, an implantable circuit). Meanwhile, an electronic device may receive power wirelessly from a wireless power transmitter. Accordingly, the electronic device may be referred to as a wireless power receiver.

According to some embodiments, an electronic device may be a home appliance. For example, the home appliance may be at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, or an electronic picture frame.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MM) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to some embodiments, an electronic device may be at least one of furniture, part of a building/structure, an electronic board, an electronic signature receiving device, a projector, and various measuring devices (for example, water, electricity, gas or electro-magnetic wave measuring devices). According to various embodiments, an electronic device may be one or a combination of two or more of the foregoing devices. According to some embodiments, an electronic device may be a flexible electronic device. In addition, it will be apparent to one having ordinary skill in the art that an electronic device according to an embodiment of the present disclosure is not limited to the foregoing devices and covers a new electronic device produced along with technology development.

With reference to the attached drawings, an electronic device according to various embodiments will be described below. In the present disclosure, the term 'user' may refer to a person or device (for example, artificial intelligence electronic device) that uses an electronic device.

Referring to FIG. 1, an electronic device 101 in a network environment 100 according to various embodiments is described. The electronic device 101 may include a bus 110, a processor 120, a memory 130, an input/output (I/O) interface 150, a flexible display 160, and a communication module 170. In some embodiments, at least one of the components may be omitted in the electronic device 101 or a component may be added to the electronic device 101.

The bus 110 may include a circuit that interconnects, for example, the foregoing components 120, 130, 150, 160, and 170 and allows communication (for example, control messages and/or data) between the foregoing components.

The processor 120 may include one or more of a CPU, an AP, or a communication processor (CP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component of the electronic device 101. According to an embodiment, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs (for example, the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data.

Also, the middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147. For example, the middleware 143 may perform scheduling or load balancing for the one or more task requests by processing the one or more task requests according to the priority levels assigned to the at least one application program 147.

The API 145 is, for example, an interface for the applications 147 to control functions that the kernel 141 or the middleware 143 provides. For example, the API 145 may include at least one interface or function (for example, a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) of the electronic device 101 to the user or the external device.

The flexible display 160 may include, for example, a liquid crystal display (LCD), a light emitting diode (LED) display, an organic LED (OLED) display, a microelectromechanical systems (MEMS) display, or an electronic paper display. The flexible display 160 may display, for example, various types of content (for example, text, an image, a video, an icon, or a symbol) to the user. The flexible display 160 may include a touch screen and receive, for example, a touch input, a gesture input, a proximity input, or a hovering input through an electronic pen or a user's body part. The flexible display 160 is stretchable or bendable by an external force.

The communication module 170 may establish communication, for example, between the electronic device 101 and an external device (for example, a first external electronic device 102, a second external electronic device 104, or a server 106). For example, the communication module 170 may be connected to a network 162 by wireless communication or wired communication, and communicate with the external device (for example, the second external electronic device 104 or the server 106) over the network 162.

The wireless communication may be conducted using, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. Also, the wireless communication may include, for example, short-range communication 164. The short-range communication 164 may be conducted by, for example, at least one of wireless fidelity (WiFi), Bluetooth®, near field communication (NFC), or GNSS. GNSS may include, for example, at least one of global positioning system (GPS), global navigation satellite system (Glonass®), Beidou® navigation satellite system (hereinafter, referred to as 'Beidou'), or Galileo®, the European global satellite-based navigation system, according to a area using the GNSS or a used bandwidth. In the present disclosure, the terms 'GPS' and 'GNSS' are interchangeably used with each other. The wired communication may be conducted in conformance to, for example, at least one of universal serial bus (USB), high definition multimedia interface (HDMI), recommended standard 232 (RS-232), or plain old telephone service (POTS). The network 162 may be a communication network, for example, at least one of a computer network (for example, local area network (LAN) or wide area network (WAN)), the Internet, or a telephone network.

Each of the first and second external electronic devices 102 and 104 may be of the same type as or a different type from the electronic device 101. According to an embodiment, the server 106 may include a group of one or more servers. According to various embodiments, all or a part of operations performed in the electronic device 101 may be performed in one or more other electronic devices (for example, the electronic devices 102 and 104) or the server 106. According to an embodiment, if the electronic device 101 is to perform a function or a service automatically or upon request, the electronic device 101 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

According to various embodiments of the present disclosure, the flexible display 160 may display a first graphic user interface (GUI) for character input. The memory 130 may store an instruction which, when executed, controls the processor 120 to detect a change in the bending state of the flexible display 160, change the first GUI to a second GUI in correspondence with the change of the bending state of the flexible display 160, and display the second GUI. Herein, characters may cover various types of characters such as text, digits, figures, emoticons, and handwritten messages.

According to various embodiments of the present disclosure, the memory 130 may store an instruction which, when executed, controls the processor 120 to detect a change in an angle between a first area and a second area of the flexible display 160 and display a second GUI corresponding to the changed angle between the first area and the second area.

According to various embodiments of the present disclosure, the memory 130 may store an instruction which, when executed, controls the processor 120 to determine a moved area among the first area and the second area and display the second GUI based on the result of the determination as to the moved area and the angle between the first area and the second area.

According to various embodiments of the present disclosure, the electronic device 101 may further include a pressure sensor (not shown) for detecting a first pressure corresponding to the first area and a second pressure corresponding to the second area, and the memory 130 may store an instruction which, when executed, controls the processor 120 to determine the moved area based on the first pressure and the second pressure.

According to various embodiments of the present disclosure, the memory 130 may store an instruction which, when executed, controls the processor 120 to determine an area corresponding to a higher pressure between the first pressure and the second pressure to be the moved area, if the difference between the first pressure and the second pressure exceeds a predetermined threshold.

According to various embodiments of the present disclosure, the memory 130 may store an instruction which, when executed, controls the processor 120 to determine that both the first area and the second area have been moved, if the difference between the first pressure and the second pressure is equal to or less than the predetermined threshold.

According to various embodiments of the present disclosure, the pressure sensor may be disposed on the flexible display 160 or on a rear surface of a housing of the electronic device 101.

According to various embodiments of the present disclosure, the electronic device 101 may further include at least one of a first motion sensor disposed in correspondence with the position of the first area and a second motion sensor disposed in correspondence with the position of the second area, and the memory 130 may store an instruction which, when executed, controls the processor 120 to determine the moved area using at least one of first sensing data from the first motion sensor and second sensing data from the second motion sensor.

According to various embodiments of the present disclosure, the memory 130 may store an instruction which, when executed, controls the processor 120 to display the second GUI in a larger size than the first GUI, if the processor 120 determines that the angle between the first area and the second area has increased, and display the second GUI in a smaller size than the first GUI, if the processor 120 determines that the angle between the first area and the second area has decreased.

According to various embodiments of the present disclosure, the memory 130 may store an instruction which, when executed, controls the processor 120 to determine the position of a bending axis upon which the flexible display 160 is bent and display the second GUI according to the position of the bending axis in the operation for detecting a change in the bending state of the flexible display 160.

According to various embodiments of the present disclosure, the memory 130 may store an instruction which, when executed, controls the processor 120 to determine the size of the second GUI according to the size of a part of the flexible display 160, which is defined by the bending axis.

According to various embodiments of the present disclosure, the memory 130 may store an instruction which, when executed, controls the processor 120 to display a third GUI in a third area of the flexible display 160 corresponding to the position of the bending axis.

According to various embodiments of the present disclosure, the memory 130 may store an instruction which, when executed, controls the processor 120 to, upon receipt of the position change input for the second GUI, change the position of the second GUI in correspondence with the position change input and display the second GUI at the changed position.

According to various embodiments of the present disclosure, the memory 130 may store an instruction which, when executed, controls the processor 120 to read association information between the change of the bending state of the flexible display 160 and the second GUI and display the second GUI based on the read association information.

According to various embodiments of the present disclosure, the second GUI may be of the same type as the first GUI and have a different size from that of the first GUI, or may be of a different type from the first GUI or in a shape obtained by modifying the shape of the first GUI.

Figure 2:
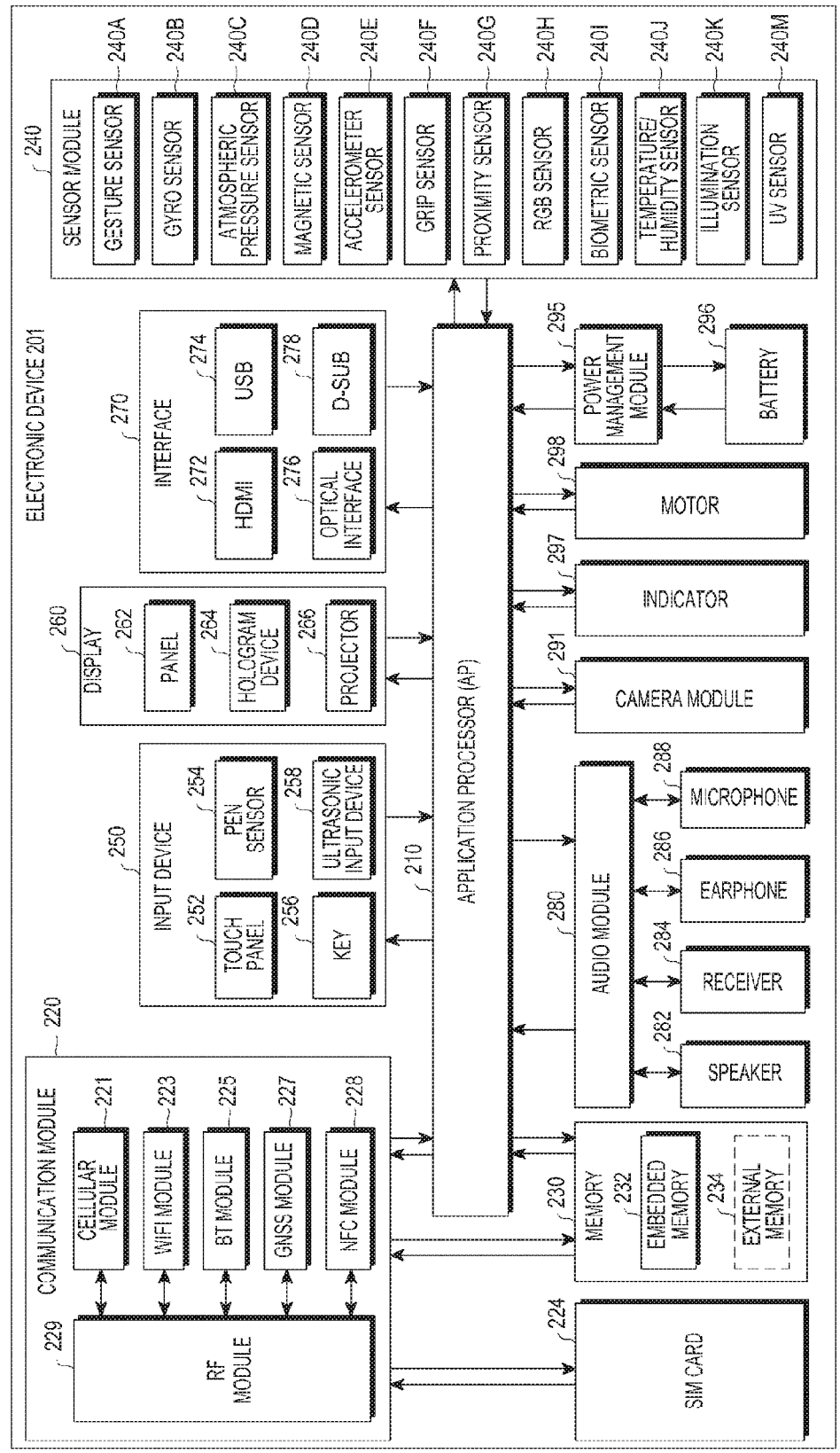
FIG. 2 illustrates a block diagram of an electronic device according to various embodiments of the present disclosure.

FIG. 2 is a block diagram of an electronic device 201 according to various embodiments of the present disclosure. The electronic device 201 may include, for example, the whole or part of the electronic device 101 illustrated in FIG. 1. The electronic device 201 may include at least one processor (for example, AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may, for example, control a plurality of hardware or software components that are connected to the processor 210 by executing an OS or an application program, and may perform processing or computation of various types of data. The processor 210 may be implemented, for example, as a system on chip (SoC). According to an embodiment, the processor 210 may further include a graphics processing unit (GPU) and/or an image signal processor. The processor 210 may include at least a part (for example, a cellular module 221) of the components illustrated in FIG. 2. The processor 210 may load a command or data received from at least one of other components (for example, a non-volatile memory), process the loaded command or data, and store various types of data in the non-volatile memory.

The communication module 220 may have the same configuration as or a similar configuration to the communication module 170 illustrated in FIG. 1. The communication module 220 may include, for example, the cellular module 221, a WiFi module 223, a Bluetooth® (BT) module 225, a GNSS module 227 (for example, a GPS module, a Glonass® module, a Beidou® module, or a Galileo® module), an NFC module 228, and a radio frequency (RF) module 229.

The cellular module 221 may provide services such as voice call, video call, text service, or the Internet service, for example, through a communication network. According to an embodiment, the cellular module 221 may identify and authenticate the electronic device 201 within a communication network, using the SIM (for example, a SIM card) 224.

According to an embodiment, the cellular module 221 may perform at least a part of the functionalities of the processor 210. According to an embodiment, the cellular module 221 may include a CP.

Each of the WiFi module 223, the BT module 225, the GNSS module 227, and the NFC module 228 may include, for example, a processor that processes data received or transmitted by the module. According to an embodiment, at least a part (for example, two or more) of the cellular module 221, the WiFi module 223, the BT module 225, the GNSS module 227, or the NFC module 228 may be included in a single integrated chip (IC) or IC package.

The RF module 229 may transmit and receive, for example, communication signals (for example, RF signals). The RF module 229 may include, for example, a transceiver, a power amplifier module (PAM), a frequency filter, a low noise amplifier (LNA), an antenna, or the like. According to another embodiment, at least one of the cellular module 221, the WiFi module 223, the BT module 225, the GNSS module 227, or the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state drive (SSD).

The external memory 234 may further include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. In various embodiments, the sensor module 240, for example, may be or may include sensor module 190 of electronic device 101. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultra violet (UV) sensor 240M. Additionally or alternatively, the sensor module 240 may include, for example, an electrical-nose (E-nose) sensor, an electromyogram (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252, a (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (for example, a microphone 288), and identify data corresponding to the sensed ultrasonic signals.

The display 260 (for example, the flexible display 160) may include a panel 262, a hologram device 264, or a projector 266. The panel 262 may have the same configuration as or a similar configuration to the flexible display 160 illustrated in FIG. 1. The panel 262 may be configured to be, for example, flexible, transparent, or wearable. The panel 262 and the touch panel 252 may be implemented as a single module. The hologram device 264 may utilize the interference of light waves to provide a three-dimensional image in empty space. The projector 266 may display an image by projecting light on a screen. The screen may be positioned, for example, inside or outside the electronic device 201. According to an embodiment, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication module 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment, the camera module 291 may include one or more image sensors (for example, a front sensor or a rear sensor), a lens, an image signal processor (ISP), or a flash (for example, an LED or a xenon lamp).

The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (for example, the processor 210), for example, boot status, message status, or charge status. The motor 298 may convert an electrical signal into a mechanical vibration and generate vibrations or a haptic effect. While not shown, the electronic device 201 may include a processing device for supporting mobile TV (for example, a GPU). The processing device for supporting mobile TV may process media data compliant with, for example, digital multimedia broadcasting (DMB), digital video broadcasting (DVB), or MediaFLO™.

Figure 3:
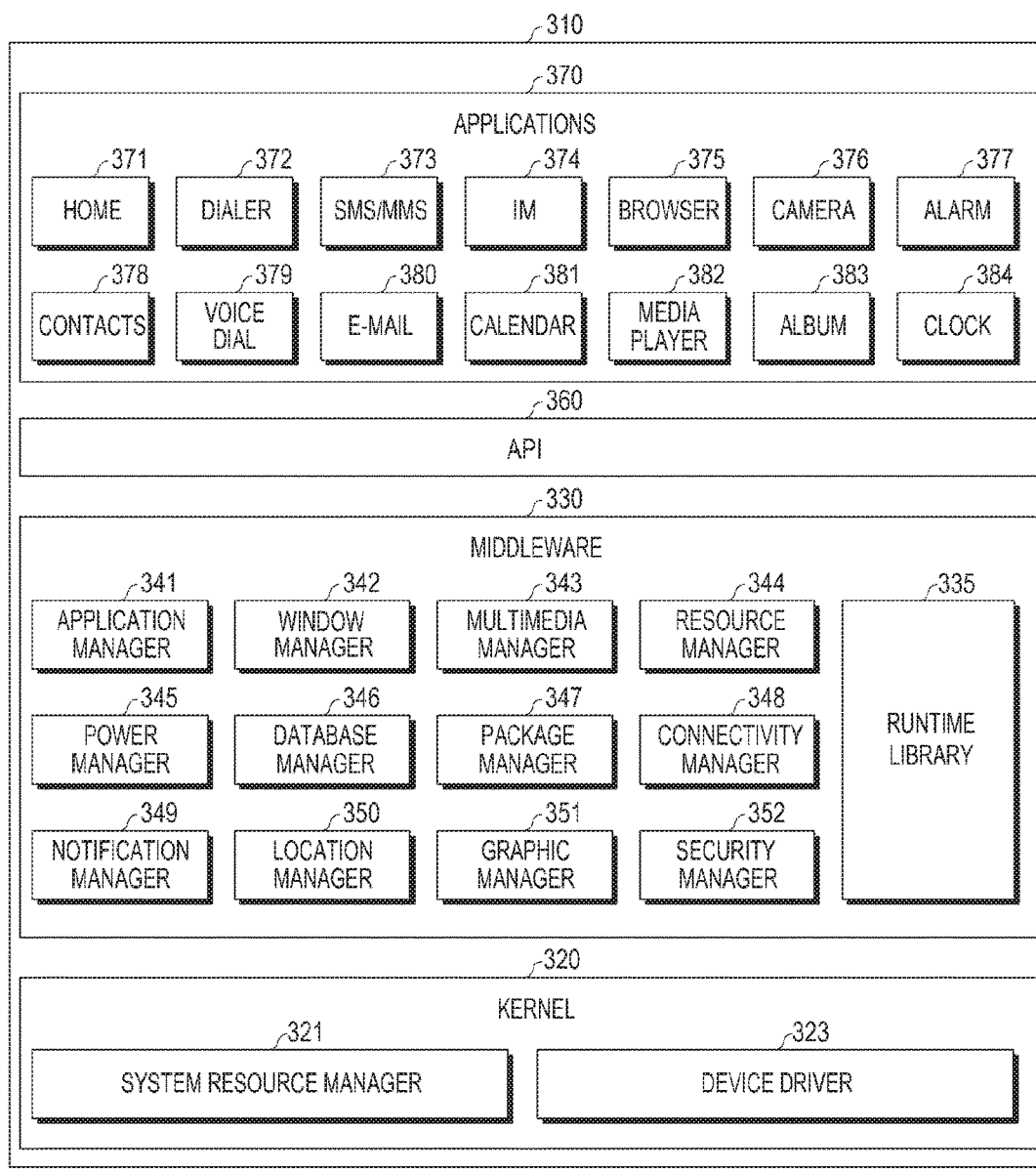
FIG. 3 illustrates a block diagram of a programming module according to various embodiments of the present disclosure.

FIG. 3 is a block diagram of a programming module according to various embodiments. According to an embodiment, a programming module 310 (for example, a program 140) may include an OS that controls resources related to an electronic device (for example, the electronic device 101) and/or various applications executed on the OS (for example, the application programs 147). For example, the OS may be Android®, iOS®, Windows®, Symbian®, Tizen®, Bada®, or the like.

The programming module 310 may include a kernel 320, middleware 330, an Application Programming Interface (API) 360, and/or applications 370. At least a part of the programming module 310 may be preloaded on the electronic device or downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or deallocate system resources. According to an embodiment, the system resource manager 321 may include a process manager, a memory manager, a file system manager, or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may, for example, provide a function required commonly for the applications 370 or provide various functionalities to the applications 370 through the API 360 so that the applications 370 may efficiently use limited system resources available within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, or the like.

The application manager 341 may manage, for example, the life cycle of at least one of the applications 370. The window manager 342 may manage GUI resources used for a screen. The multimedia manager 343 may determine formats required to play back various media files and may encode or decode a media file using a CODEC suitable for the format of the media file. The resource manager 344 may manage resources such as a source code of at least one of the applications 370, a memory, or storage space.

The power manager 345 may, for example, manage a battery or a power source by operating in conjunction with a basic input/output system (BIOS) and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity of WiFi, Bluetooth®, or the like. The notification manager 349 may display or notify an event such as message arrival, a schedule, a proximity notification, or the like in a manner that does not bother a user. The location manager 350 may mange position information about the electronic device. The graphic manager 351 may manage graphical effects to be provided to the user or related user interfaces. The security manager 352 may provide an overall security function required for system security, user authentication, or the like. In an embodiment, if the electronic device (for example, the electronic device 101) has a telephony function, the middleware 330 may further include a telephony manager to manage a voice or video call function of the electronic device.

A new middleware module may be created and used by combining various functions of the above-described component modules in the middleware 330. The middleware 330 may provide a customized module for each OS type in order to provide differentiated functions. In addition, the middleware 330 may dynamically delete a part of the existing components or add a new component.

The API 360 (for example, the API 145) is, for example, a set of API programming functions, which may be configured differently according to an OS. For example, in the Android® or iOS® systems, one API set may be provided per platform. Whereas in the Tizen® system, for example, two or more API sets may be provided per platform.

The applications 370 (for example, the application programs 147) may include, for example, one or more applications capable of executing functions such as home 371, dialer 372, short message service/multimedia messaging service (SMS/MMS) 373, Instant message (IM) 374, browser 375, camera 376, alarm 377, contacts 378, voice dial 379, email 380, calendar 381, media player 382, album 383, or clock 384, health care (for example, measurement of an exercise amount or a glucose level), or providing of environment information (for example, information about atmospheric pressure, humidity, or temperature).

According to an embodiment, the applications 370 may include an application (for the convenience of description, referred to as 'information exchange application') supporting information exchange between the electronic device (for example, the electronic device 101) and an external electronic device (the electronic device 102 or 104). The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the electronic device 102 or 104). Also, the notification relay application may, for example, receive notification information from the external electronic device and transmit the received notification information to a user.

The device management application may, for example, manage (for example, install, delete, or update) at least a part of functions of the external electronic device (for example, the electronic device 102 or 104) communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment, the applications 370 may include (an application (for example, a health care application of a mobile medical equipment) designated according to) a property of the external electronic device (for example, the electronic device 102 or 104). According to an embodiment, the applications 370 may include an application received from an external electronic device (for example, the server 106 or the electronic device 102 or 104). According to an embodiment, the applications 370 may include a preloaded application or a third party application downloadable from a server. The names of components of the programming module 310 according to the embodiment of the present disclosure may vary according to the type of an OS.

According to various embodiments, at least a part of the programming module 310 may be implemented in software, firmware, hardware, or a combination of at least two of them. At least a part of the programming module 310 may be implemented (for example, executed) by the processor (for example, the processor 210). At least a part of the programming module 310 may include, for example, a module, a program, a routine, a set of instructions, or a process to execute one or more functions.

Figure 4:
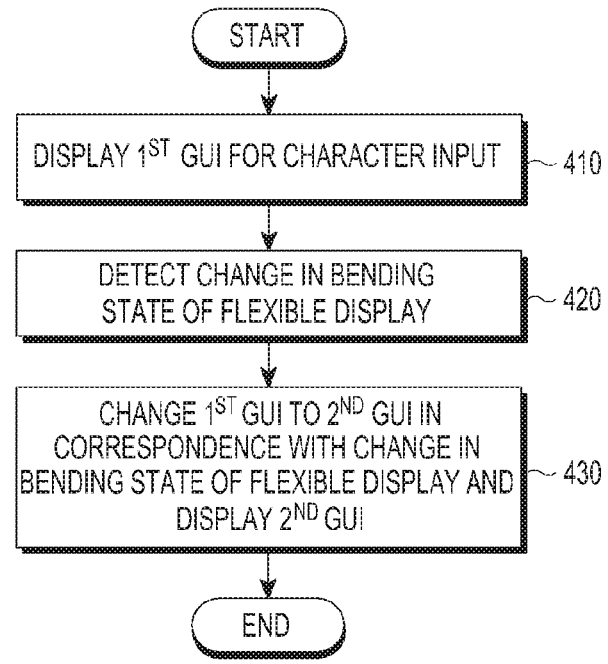
FIG. 4 is a flowchart illustrating a method for operating an electronic device according to various embodiments of the present disclosure.

FIG. 4 is a flowchart illustrating a method for operating an electronic device according to various embodiments of the present disclosure. As described before, an electronic device according to various embodiments of the present disclosure may include a flexible display.

In operation 410, the electronic device 101 may display a first GUI for character input on the flexible display. The first GUI may be configured as a keyboard for character input. In this case, the first GUI may include a plurality of objects corresponding to a plurality of characters. When the plurality of objects is configured, corresponding characters may be mapped to the objects. For example, the electronic device 101 may display, as the first GUI, a GUI of a first size which operates in a first scheme (for example, a QWERTY keyboard).

In operation 420, the electronic device 101 may detect a change in the bending state of the flexible display. The electronic device 101 may include at least one sensor associated with the flexible display. As far as it is capable of detecting a change in the bending state of the flexible display, any sensor may be used. For example, the sensor may be a pressure sensor connected to at least a part of the flexible display. Or the sensor may be a pressure sensor disposed at a spot where a pressure is changed when the flexible display is curved, for example, bent. If the sensor is configured as a pressure sensor, the sensor may sense a pressure corresponding to bending of the flexible display. The electronic device 101 may detect a change in the bending state of the flexible display based on the pressure sensed by the sensor. Aside from the pressure sensor, the electronic device 101 may detect a change in the bending state of the flexible display based on data from various hardware components, which will be described later in detail in various embodiments.

In operation 430, the electronic device 101 may change the first GUI to a second GUI based on a detected change of the bending state and display the second GUI. In an embodiment, the electronic device 101 may change the first GUI of the first size operating in the first scheme (for example, a QWERTY keyboard) to a second GUI of a second size operating in the first scheme (for example, a QWERTY keyboard), and display the second GUI. The electronic device 101 may display the second GUI only in an area of the flexible display, which is stable against the bending of the flexible display. In another embodiment, the electronic device 101 may change the first GUI of the first size operating in the first scheme (for example, a QWERTY keyboard) to a second GUI of the second size operating in a second scheme (for example, a digit keyboard) and display the second GUI. As described above, the second GUI may differ from the first GUI in terms of size, operating scheme, or both. Implementation examples of the second GUI will be described later in more detail. Second GUIs may be preset in correspondence with shapes of the flexible display. That is, the electronic device 101 may pre-store association information between shapes of the flexible display and second GUIs, and display a second GUI corresponding to a detected shape of the flexible display. Or second GUIs may be preset in correspondence with sensing data corresponding to bending states of the flexible display. That is, the electronic device 101 may pre-store association information between sensing data and second GUIs and display a second GUI corresponding to sensing data.

As described above, in the electronic device and the method for operating the electronic device according to various embodiments of the present disclosure, one GUI may be changed to another GUI according to a change in the bending state of the flexible display and the changed GUI may be displayed. Now, a description will be given of embodiments in which one GUI is changed to another GUI and the changed GUI is displayed under various conditions.

Figure 5:
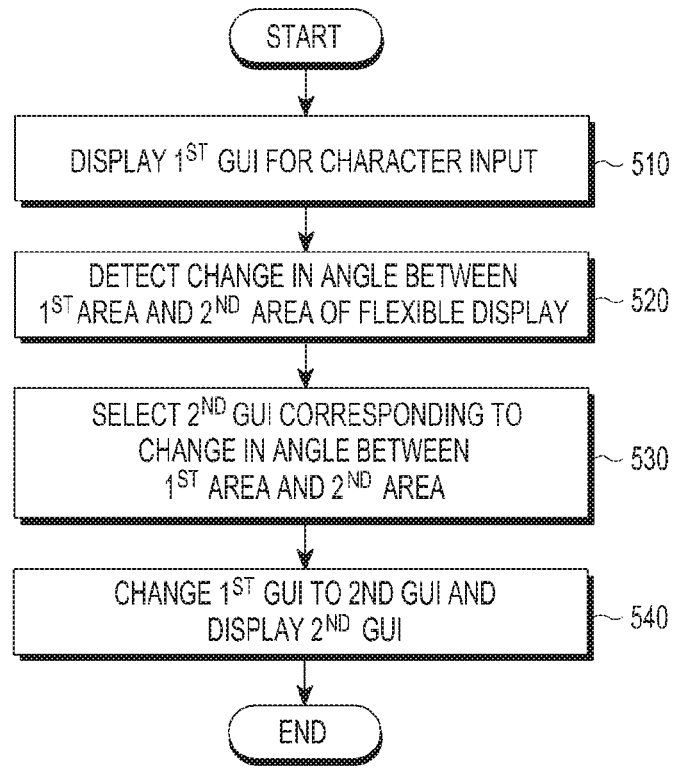
FIG. 5 is a flowchart illustrating a method for operating an electronic device according to various embodiments of the present disclosure.
Figure 6A:
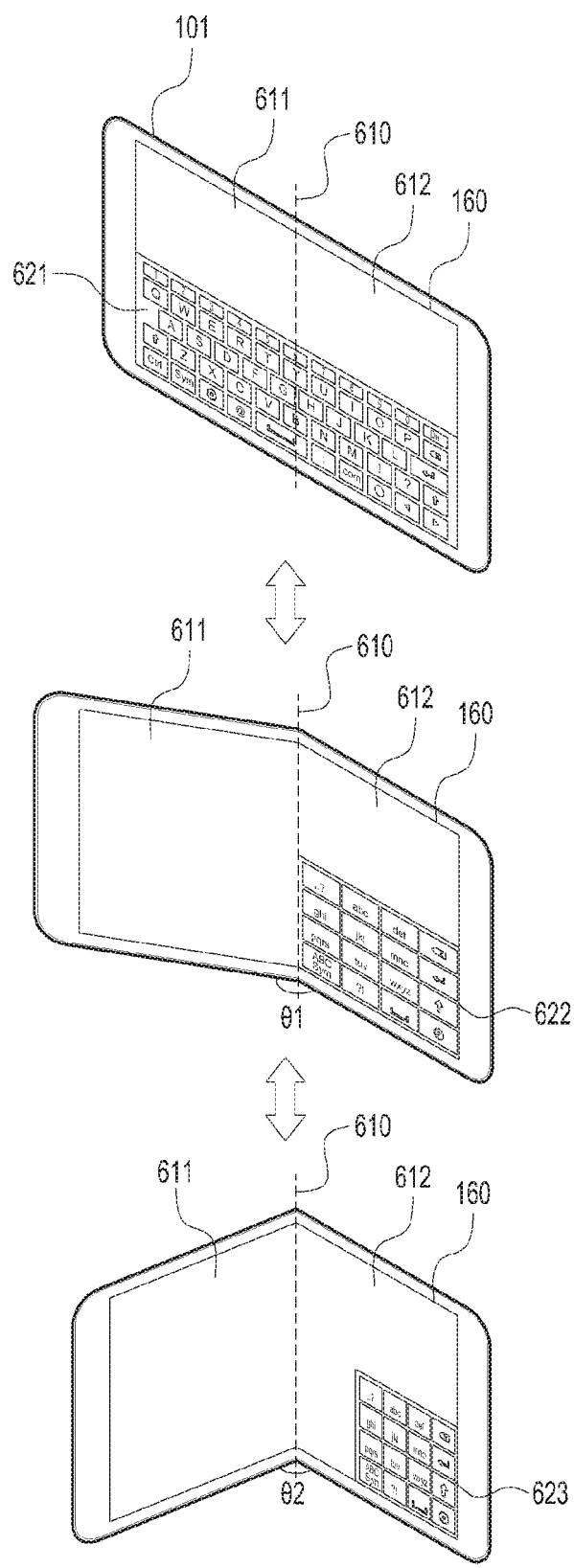
FIGS. 6A and 6B are conceptual views illustrating an electronic device according to various embodiments of the present disclosure.
Figure 6B:
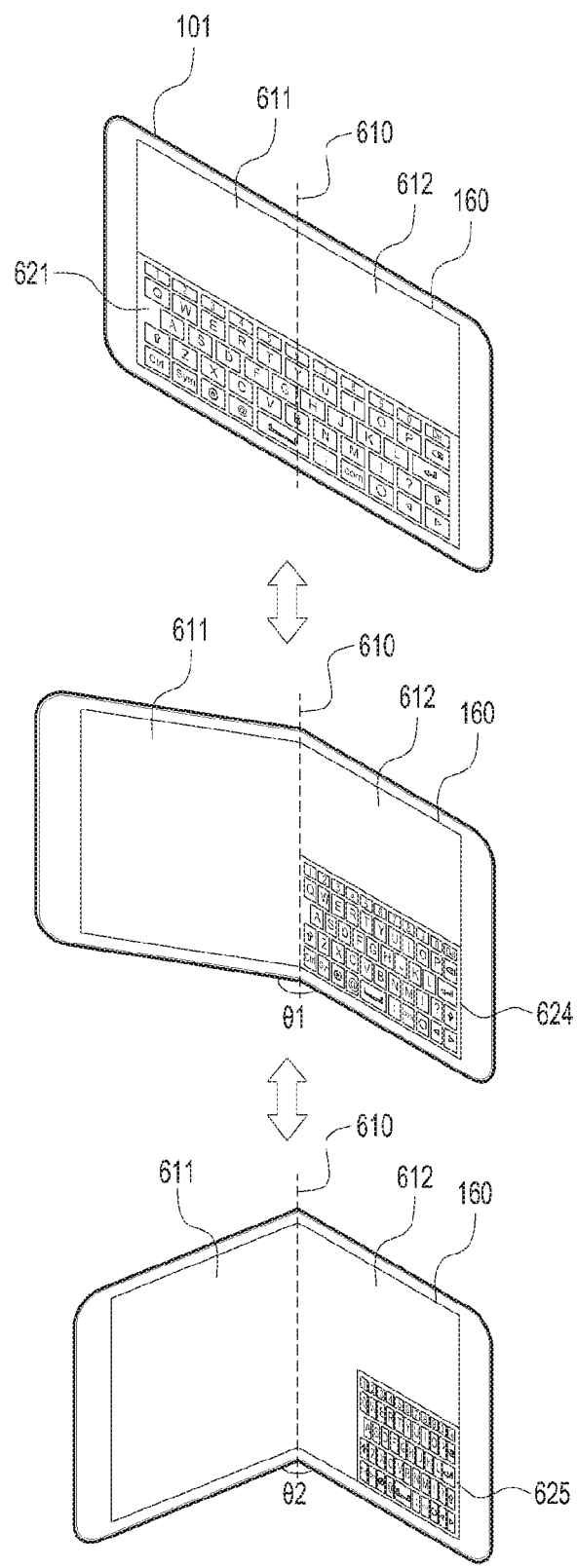

FIG. 5 is a flowchart illustrating a method for operating an electronic device according to various embodiments of the present disclosure. The embodiment of FIG. 5 will be described in detail with reference to FIGS. 6A and 6B. FIGS. 6A and 6B are conceptual views of an electronic device according to various embodiments of the present disclosure.

In operation 510, the electronic device 101 may display a first GUI for character input. For example, as illustrated in the top drawing of FIG. 6A, the electronic device 101 may display a first GUI 621 on the flexible display 160. In the embodiment of FIG. 6A, the first GUI 621 may be a QWERTY keyboard of a first size. More specifically, the length of one side of the first GUI 621 may be equal to the length of one side of the flexible display 160. This is only one embodiment, as the length of one side of the first GUI 621 may be equal to the length of one side of a remaining area of the flexible display 160 except for a status bar (not shown).

In operation 520, the electronic device 101 may detect a change in the angle between a first area and a second area of the flexible display. For example, as illustrated in the middle drawing of FIG. 6B, the flexible display 160 may be bent upon one axis 610. The axis 610 may be preset or set arbitrarily. If the axis 610 is preset, this may imply that only a specific area of the flexible display 160 (for example, a partial area of the flexible display 160 including the axis 610) is bendable. While the axis 160 is shown as defined along the center of the electronic device 101 in FIG. 6A, it will be readily understood to those skilled in the art that the position of the axis 610 is not limited. Meanwhile, one area of the flexile display 160 defined by the axis 610 is referred to as a first area 611 and the other area of the flexile display 160 defined by the axis 610 is referred to as a second area 612. That is, the first and second areas 611 and 612 may refer to two areas which get to have different orientations by bending of the flexible display 160. The electronic device 101 may detect a change in the angle between the first area 611 and the second area 612. For example, the angle between the first area 611 and the second area 612 may be 180 degrees in the embodiment illustrated in the top drawing of FIG. 6A. For example, the angle between the first area 611 and the second area 612 may be θ1 in the embodiment illustrated in the middle drawing of FIG. 6A. The electronic device 101 may detect the change of the angle between the first area 611 and the second area 612 from 180 degrees to θ1. The electronic device 101 may detect the angle between the first area 611 and the second area 612 in various manners. For example, the electronic device 101 may determine the angle between the first area 611 and the second area 612 based on a bending degree of the bent part of the flexible display 160, that is, the area including the axis 610. As the angle between the first area 611 and the second area 612 increases, the bending degree of the bent part of the flexible display 160 may increase, and the electronic device 101 may determine the angle between the first area 611 and the second area 612 according to the bending degree of the bent part of the flexible display 160. A structure for measuring a bending degree in the electronic device 101 will be described later in more detail. Or the electronic device 101 may determine the angle between the first area 611 and the second area 612 using sensing data from a motion sensor disposed in correspondence with the position of at least one of the first and second areas 611 and 612.

In operation 530, the electronic device 101 may select a second GUI corresponding to the changed angle between the first area 611 and the second area 612. The electronic device 101 may pre-store association information between angles between the first and second areas 611 and 612 and second GUIs. The electronic device 101 may select a second GUI corresponding to the angle between the first area 611 and the second area 612 based on the pre-stored association information.

In operation 540, the electronic device 101 may display the second GUI by replacing the first GUI with the second GUI. For example, as illustrated in the middle drawing of FIG. 6A, the electronic device 101 may display a second GUI 622. In the embodiment of FIG. 6A, the second GUI 622 may be a keyboard operating in a second scheme. The second GUI 622 may have a second size. For example, the length of one side of the second GUI 622 may be equal to the length of the second area 612. That is, as described before, the electronic device 101 may change a GUI type according to the decreased angle between the first area 611 and the second area 612. Further, the electronic device 101 may display the second GUI 622 only in a stable area, that is, the second area 612. Meanwhile, the embodiments illustrated in the top, middle and bottom drawings of FIG. 6A may be reversible. Referring to FIG. 6A, the electronic device 101 may detect a further change from θ1 to θ2 in the angle between the first area 611 and the second area 612, and thus may display a third GUI 623 by replacing the second GUI 622 with the third GUI 623 in correspondence with the further change. The third GUI 623 may be of the same type as the second GUI 622 and have smaller size than the second GUI 622.

FIG. 6B is a conceptual view of an electronic device according to various embodiments of the present disclosure. Referring to FIG. 6B, the electronic device 101 may detect the change of the angle between the first area 611 and the second area 612 from 180 degrees to θ1. The electronic device 101 may display a second GUI in the second area 612 in correspondence with the detected changed angle. The second GUI 624 may be of the same type as the first GUI 621 but have a smaller size than the first GUI 621. That is, the electronic device 101 may display the second GUI 624 of the same type as the first GUI 621, which has been scaled down in size from the first GUI 621. The electronic device 101 may display the second GUI 624 in a size determined in correspondence with the size of the second area 612. Further, the electronic device 101 may detect a further change from θ1 to θ2 in the angle between the first area 611 and the second area 612, and thus may display a third GUI 625 by replacing the second GUI 624 with the third GUI 625 in correspondence with the further change. The third GUI 625 may be of the same type as the second GUI 624 and have a smaller size than the second GUI 624.

As described above, the electronic device 101 according to various embodiments of the present disclosure may change one GUI to another GUI in correspondence with a change in the bending state of the flexible display, for example, a change in the angle between the first area and the second area and display the changed GUI. The changed GUI may differ from the previously displayed GUI in size or type. The electronic device 101 may change a GUI based on association information between angles between the first and second areas and GUIs, and display the changed GUI. Or the electronic device 101 may change a GUI based on association information between GUIs and sensing data related to angles between the first and second areas, for example, sensing data related to degrees of bending in the vicinity of a rotation axis.

Figure 7:
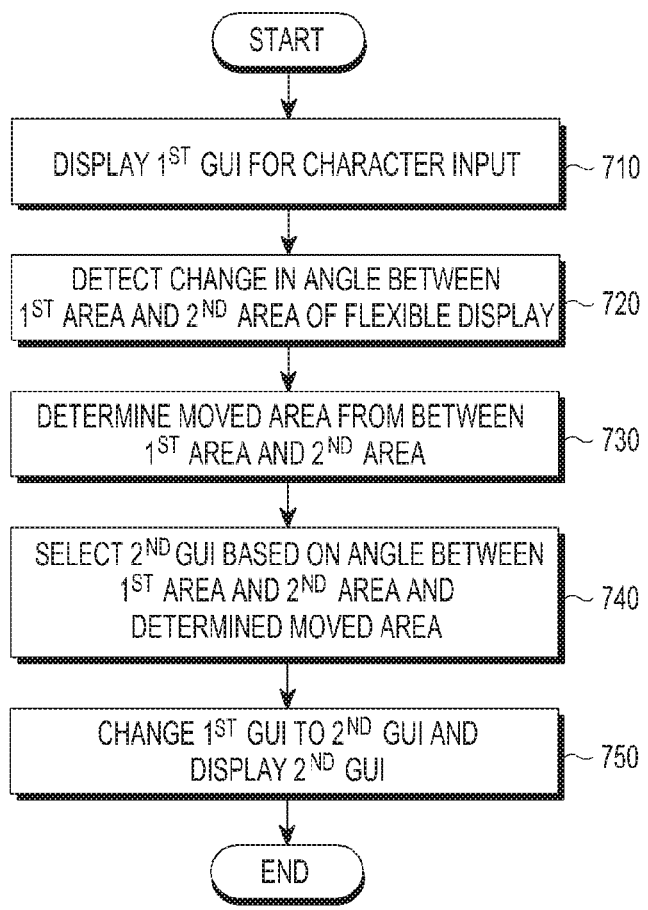
FIG. 7 is a flowchart illustrating a method for operating an electronic device according to various embodiments of the present disclosure.
Figure 8A:
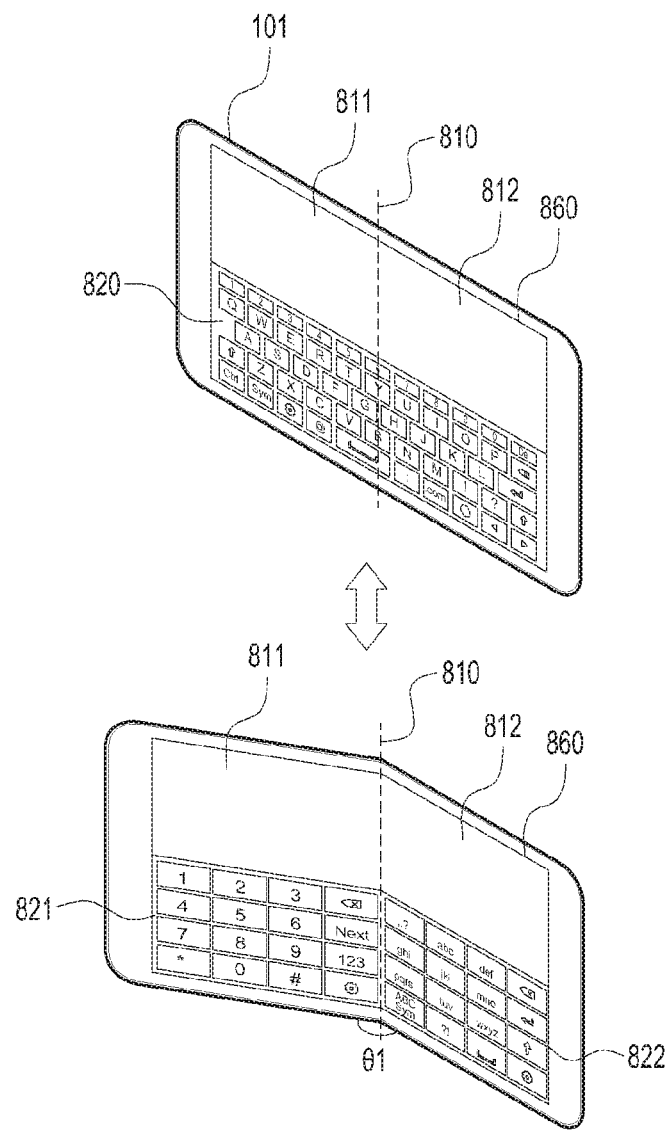
FIGS. 8A, 8B, and 8C are conceptual views illustrating an electronic device according to various embodiments of the present disclosure.
Figure 8B:
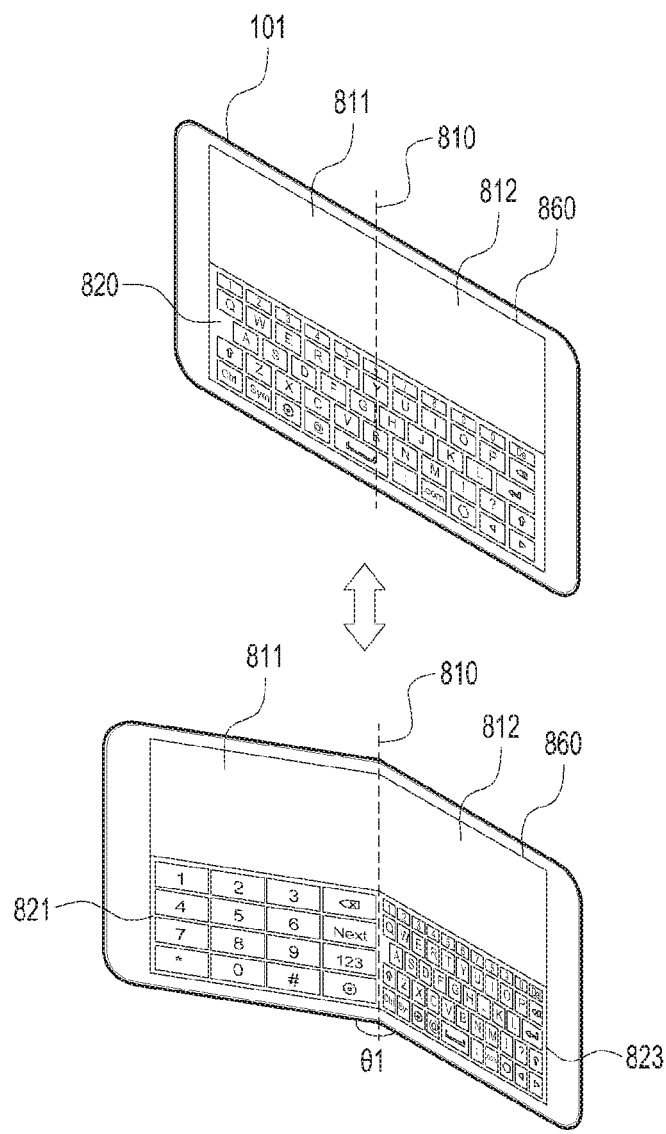
Figure 8C:
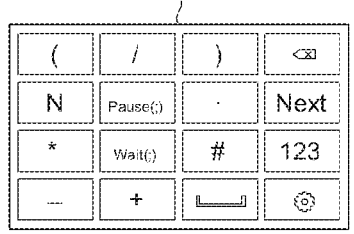
Figure 8C:
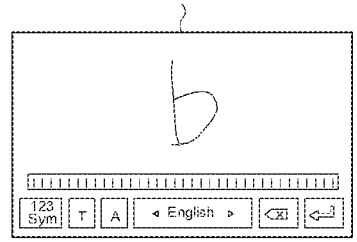
Figure 8C:
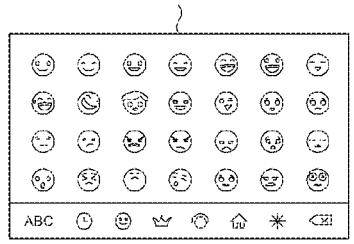
Figure 8C:
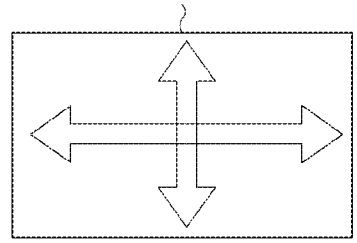

FIG. 7 is a flowchart illustrating a method for operating an electronic device according to various embodiments of the present disclosure. The embodiment of FIG. 7 will be described in detail with reference to FIGS. 8A, 8B, and 8C. FIGS. 8A, 8B, and 8C are conceptual views of an electronic device according to various embodiments of the present disclosure.

In operation 710, the electronic device 101 may display a first GUI for character input. For example, as illustrated in FIG. 8A, the electronic device 101 may display a first GUI 820 on the flexible display 160. The electronic device 101 may be bent upon an axis 810, as illustrated in FIG. 8A. Consequently, the angle between a first area 811 and a second area 812 may be changed.

In operation 720, the electronic device 101 may detect a change in the angle between the first area 811 and the second area 812 of the flexible display 860. As illustrated in FIG. 8A, the electronic device 101 may detect a change from 180 degrees to θ1 in the angle between the first area 811 and the second area 812.

In operation 730, the electronic device 101 may determine which area has moved among the first area 811 and the second area 812. For example, the electronic device 101 may determine the moved area based on sensing data from a motion sensor disposed in correspondence with the position of at least one of the first and second areas 811 and 812. For example, if the first area 811 has moved, sensing data from a motion sensor disposed in correspondence with the position of the first area 811 may have a non-zero value. Further, if the second area 812 has moved, sensing data from a motion sensor disposed in correspondence with the position of the second area 812 may have a non-zero value. If the electronic device 101 includes two motion sensors disposed in correspondence with the positions of the respective first and second areas 811 and 812, the electronic device 101 may determine a moved area using sensing data from the two motion sensors. Or in the case where the electronic device 101 includes a single motion sensor disposed in correspondence with the position of the first area 811, if sensing data from the motion sensor has a non-zero value, the electronic device 101 may determine the first area 811 to have moved. In this case, if the electronic device 101 has detected an angle change and the sensing data from the motion sensor has a substantially zero value, the electronic device 101 may determine the second area 812 to have moved. If sensing data has a substantially zero value, this may mean that the sensing data has a value less than a predetermined threshold. In addition, if the sensing data has a non-zero value, this may mean that the sensing data has a value equal to or greater than the predetermined threshold.

Or the electronic device 101 may determine the moved area based on the difference between a pressure detected from the first area 811 and a pressure detected from the second area 812. A user may bend the flexible display 860, while grabbing, for example, the first area 811. In this example, the pressure detected from the first area 811 may be greater than the pressure detected from the second area 812. The electronic device 101 may determine the moved area based on the detected pressures.

In operation 740, the electronic device 101 may select a second GUI based on the angle between the first area 811 and the second area 812 and the determination of the moved area.

In operation 750, the electronic device 101 may display the second GUI by replacing the first GUI with the second GUI.

For example, as illustrated in FIG. 8A, the electronic device 101 may determine a digit pad 821 and a keyboard 822 of a second type as the second GUI. The digit pad 821 may be displayed in the first area 811 and the second-type keyboard 822 may be displayed in the second area 812. That is, the electronic device 101 may select the digit pad 821 as a GUI corresponding to the moved area and the second-type keyboard 822 as a GUI corresponding to the stable area. Further, the electronic device 101 may determine the second-type keyboard 822 in correspondence with an angle change. The electronic device 101 may change a GUI type by replacing the first-type QWERTY keyboard with the second-type keyboard in correspondence with the change of the angle between the first area 811 and the second area 812. While not shown, if the second area 812 has moved, the electronic device 101 may display the digit pad 821 in the second area 812 and the second-type keyboard 822 in the first area 811.

Referring to FIG. 8B, the electronic device 101 may determine a second GUI including the digit pad 821 and a first-type keyboard 823 in correspondence with a change from 180 degrees to θ1 in the angle between the first area 811 and the second area 812. The electronic device 101 may scale down the GUI in size in correspondence with the size of the stable area, that is, the second area 812, while maintaining the GUI type unchanged.

As described above, the electronic device 101 may select a new GUI according to information about an area moved by or stable against bending of the flexible display 860 as well as the bending state of the flexible display 860.

FIG. 8C is a conceptual view of GUIs of various types according to various embodiments of the present disclosure. As illustrated in FIG. 8C, the electronic device 101 may display GUIs of various types, such as a keypad 824, a handwriting input pad 825, an emoticon input pad 826, and a touch pad 827. The electronic device 101 may display a GUI of one of various types according to the bending state of the flexible display 160. Or the electronic device 101 may display a GUI of one of various types according to information about an area moved by or stable against bending of the flexible display 160 as well as the bending state of the flexible display 160.

Figure 9A:
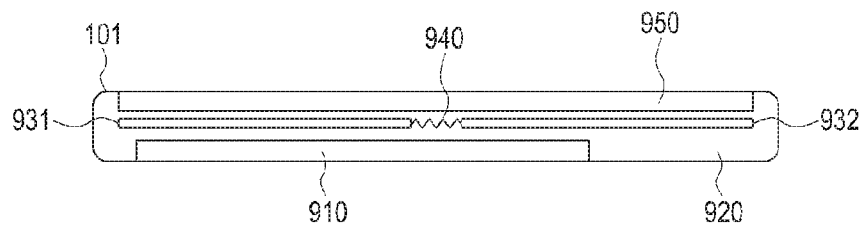
FIGS. 9A, 9B, and 9C illustrate side views of an electronic device according to various embodiments of the present disclosure.
Figure 9B:
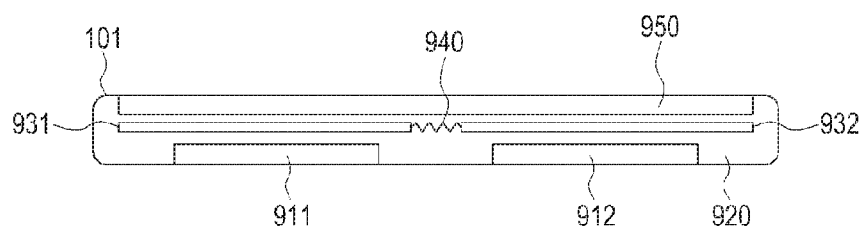
Figure 9C:
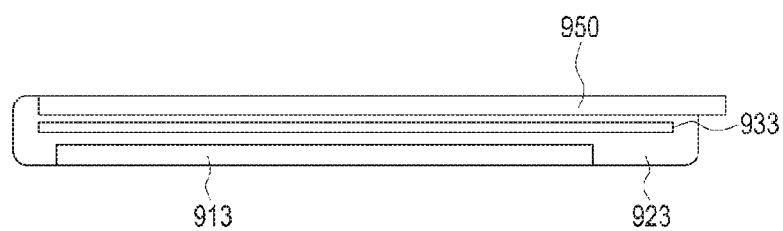

FIGS. 9A, 9B, and 9C are side views of the electronic device 101 according to various embodiments of the present disclosure.

Referring to FIG. 9A, the electronic device 101 may include a flexible battery 910, a flexible body 920, a first printed circuit board (PCB) 931, a second PCB 932, a connector 940, and a flexible display 950.

The flexible battery 910 may include at least one cell and a connected part between cells may be bendable. Meanwhile, since the first PCB 931 is connected to the second PCB 932 by the connector 940, the first and second PCBs 931 and 932 may be bent. For example, the electronic device 101 is bendable at the position of the connector 940, and a first area and a second area may be defined on the flexible display 950 with respect to the position of the connector 940.

While not shown, the electronic device 101 may include a sensor unit for sensing a bending direction and a bending degree. For example, the electronic device 101 may include a sensor for sensing a degree to which the connector 940 is deformed. The connector 940 may be configured as a resistor or capacitor having flexibility. As the bending state of the connector 940 is changed, an electrical value of the connector 940, such as a resistance or capacitance may be changed. The electronic device 101 may determine the bending state of the flexible display 950 according to the electrical value.

The flexible body 920 may contain a bendable material such as rubber or may be configured to be separable.

Referring to FIG. 9, the electronic device 101 may include a first battery 911, a second battery 912, the flexible body 920, the first PCB 931, the second PCB 932, the connector 940, and the flexible display 950.

Since the first battery 911 and the second battery 912 are spaced from each other, even though the first and second batteries 911 and 912 are not bendable, the electronic device 101 may be bent on the whole.

Referring to FIG. 9C, the electronic device 101 may include a battery 913, a body 923, a PCB 933, and the flexible display 950. In FIG. 9C, the battery 913, the body 923, and the PCB 933 may not be bendable. At least a part of the flexible display 950 may be fixed to the body 920. When a user bends the flexible display 950, grabbing at least a part of the flexible display 950, at least a part including the flexible display 950 may be bent in a corresponding direction.

FIGS. 10A to 10L are views referred to for describing measurement of bending states of the electronic device 101 according to various embodiments of the present disclosure.

Figure 10A:
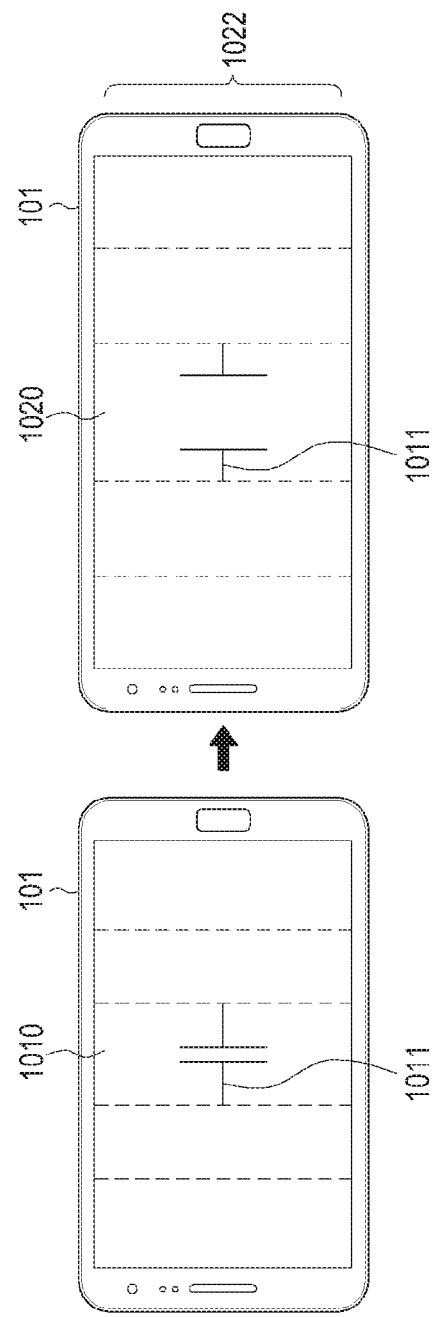

Referring to FIG. 10A, the electronic device 101 may include a touch screen panel (TSP) device 1010. In an embodiment, the TSP device 1010 may be configured as a capacitor type. Therefore, the TSP device 1010 may include at least one capacitor 1011. The capacitance of the at least one capacitor 1011 may be changed upon user touch, and the electronic device 101 may determine a touched point according to the changed capacitance.

Meanwhile, in an embodiment, the whole electronic device 101 may be bent by an external force. In this case, the capacitor 1011 in the TSP device 101 may also be stretched, as illustrated in FIG. 10A. The capacitance of the capacitor 1011 may be inversely proportional to the distance between two conductors. Accordingly, the electronic device 101 may acquire a bending state according to a capacitance change. More specifically, the electronic device 101 may check the capacitance of each of a plurality of capacitors. The electronic device 101 may determine stretched pixels according to a capacitance change of an individual capacitor. Further, the electronic device 101 may determine a bending direction according to the positions of the stretched pixels. Also, the electronic device 101 may determine degree of bending or degree of stretching according to a ratio between the old capacitance and the changed capacitance. Therefore, the electronic device 101 may determine the size of the flexible display after the flexible display is stretched. Also, the electronic device 101 may determine degree of bending or degree of stretching, that is, a bending degree according to a capacitance change rate over time.

Figure 10B:
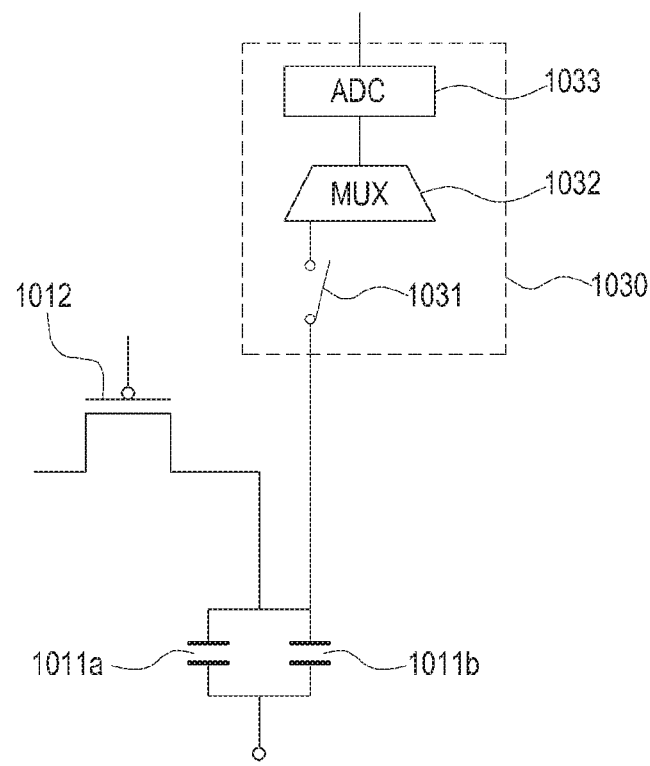

FIG. 10B illustrates connection of a bending degree measuring device in the electronic device 101 according to various embodiments of the present disclosure.

Referring to FIG. 10B, one or more capacitors 1011*a* and 1011*b* and a transistor 1012 may be included in each pixel of the display. The first capacitor 1011*a* and the second capacitor 1211*b* may be connected in parallel and deformed by bending. More specifically, if the display is stretched, the distance between conductive plates in at least one of the first and second capacitors 1011*a* and 1011*b* in the pixel may be increased. As a result, a capacitance may be decreased and the processor may determine a bending degree and a bending point according to the capacitance change. As illustrated in FIG. 10B, the second capacitor 1011*b* may be connected to a control module 1030. The control module 1030 may include a switch 1031, a multiplexer (MUX) 1032, and an analog-to-digital converter (ADC) 1033. The switch 1031 may be switched on or off according to a per pixel scanning period. For example, a line corresponding to each pixel may be connected to the MUX 1032, and a scanned pixel may be connected to the ADC 1033 during the scanning period. The ADC 1033 may convert information about a current, voltage, or capacitance of the second capacitor 1011*b* to a digital signal. The processor may acquire per pixel capacitance information and determine at least one of a bending point and a bending degree based on the per pixel capacitance information.

Figure 10C:
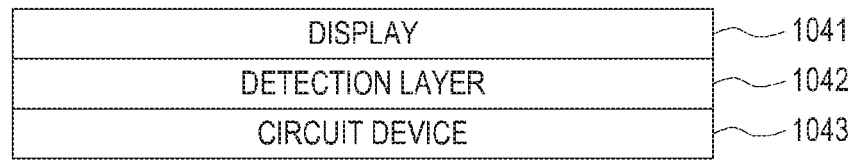
Figure 10D:
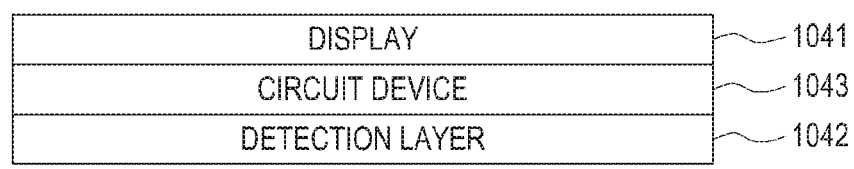

FIGS. 10C and 10D illustrate side views of an electronic device according to various embodiments of the present disclosure. Referring to FIG. 10C, a detection layer 1042 may be formed on a circuit device 1043. A display 1041 may be formed on the detection layer 1042. The detection layer 1042 is a layer capable of determining at least one of a bending degree and a bending point, which will be described later in greater detail. In another embodiment, the circuit device 1043 may be formed on the detection layer 1042, and the display 1041 may be formed on the circuit device 1043, as illustrated in FIG. 10D.

Figure 10E:
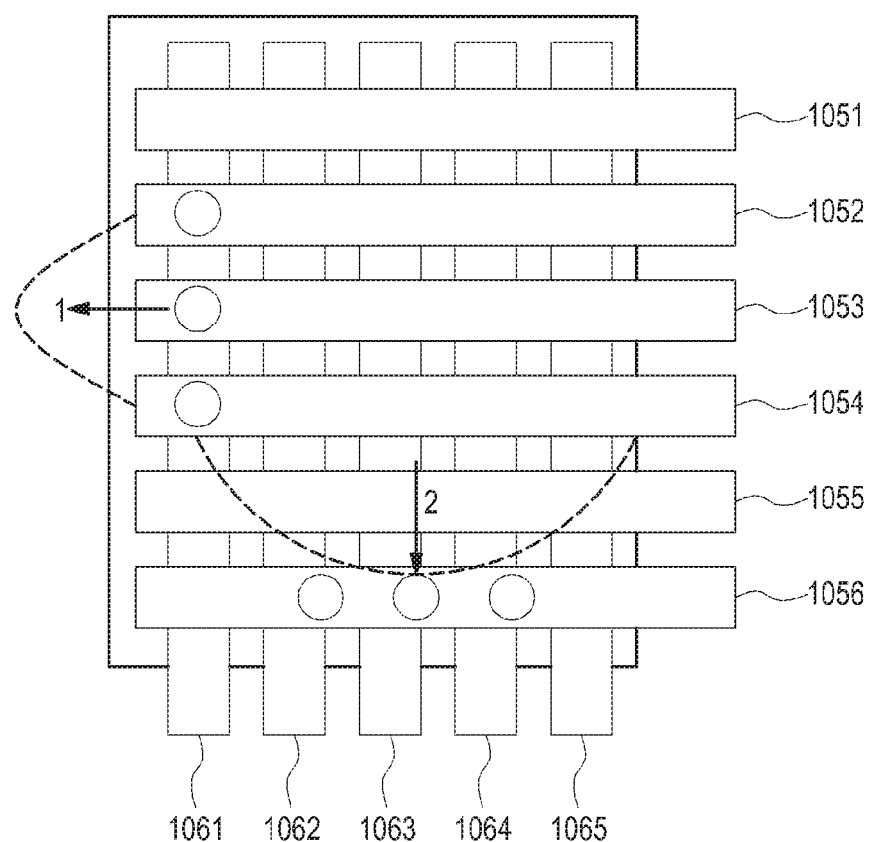

FIG. 10E is a conceptual view of a detection layer according to various embodiments of the present disclosure. As illustrated in FIG. 10E, the detection layer according to various embodiments of the present disclosure may include one or more line sensors 1051, 1052, 1053, 1054, 1055, and 1056 and 1061, 1062, 1063, 1064, and 1065. The line sensors 1051 to 1056 may be extended further along an x-axis direction than along a y-axis direction, and used in detecting the y-axis coordinate of a stretched point. The line sensors 1061 to 1065 may be extended further along the y-axis direction than along the x-axis direction, and used in detecting the x-axis coordinate of the stretched point.

For example, it is assumed that the line sensor 1053 is relatively much bent, as illustrated in FIG. 10E. In this example, the processor may determine that the bending is directed to the left direction "1" and the bending point corresponds to the line sensor 1053. In another example, it is assumed that the line sensor 1063 is relatively much bent, as illustrated in FIG. 10E.

In this example, the processor may determine that the bending is directed downward in the direction "2" and the bending point corresponds to the line sensor 1063.

Figure 10F:
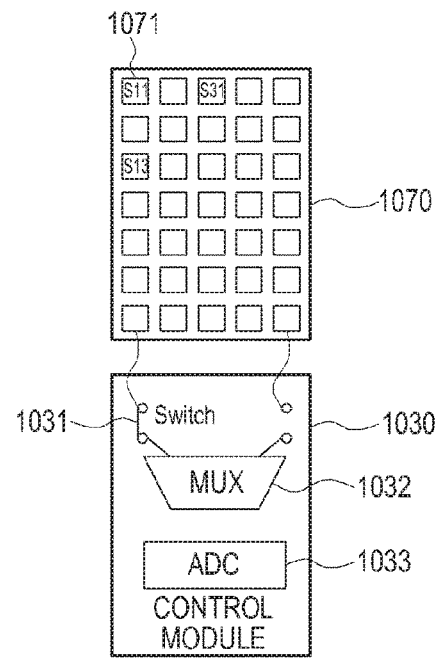

FIG. 10F is a conceptual view of a detection layer according to various embodiments of the present disclosure. As illustrated in FIG. 10F, a detection layer 1070 according to various embodiments of the present disclosure may include one or more surface sensors 1071. The surface sensors 1071 may be pressure sensors, flex sensors, or the like.

Referring to FIG. 10F, the surface sensors 1071 may be connected to the control module 1030. The control module 1030 may include the switch 1031, the MUX 1032, and the ADC 1033. The switch 1031 may be switched on or off based on a per pixel scan period. For example, a line corresponding to each of the surface sensors 1071 may be connected to the MUX 1032, and a scanned surface sensor 1071 may be connected to the ADC 1033 during the scan period. The ADC 1033 may convert information about a stretched degree or contracted degree of the surface sensor 1071 to a digital signal. The processor may determine the bending degree of each surface sensor 1071 and thus determine at least one of a bending point and a bending degree. Particularly, each surface sensor 1071 has absolute coordinates and the processor may determine a bending point based on the absolute coordinates of the surface sensors 1071.

Figure 10G:
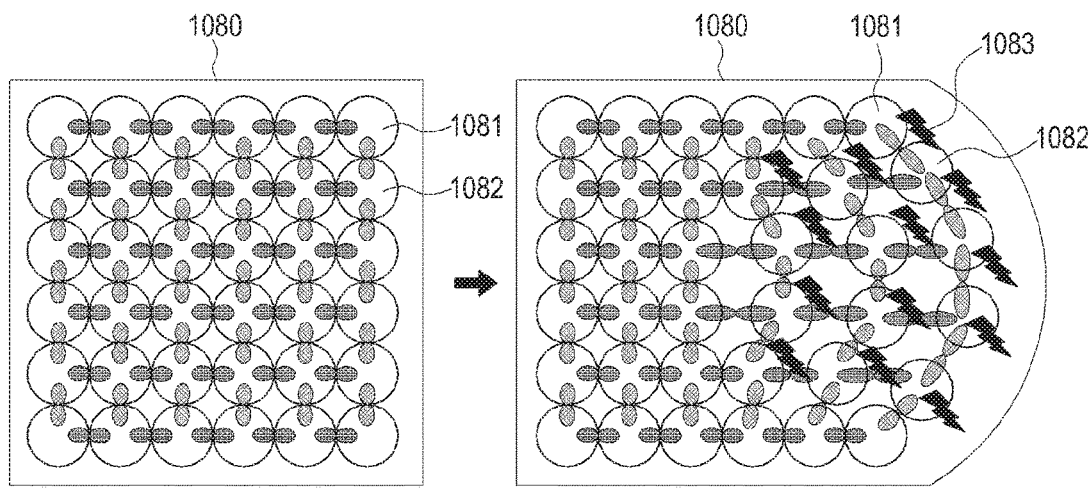

FIG. 10G is a conceptual view of a detection layer according to various embodiments of the present disclosure. The embodiment of FIG. 10 will be described in detail with reference to FIGS. 10H and 10I. Referring to FIG. 10G, a detection layer 1080 may include a plurality of conductive cells 1081 and 1082.

Figure 10H:
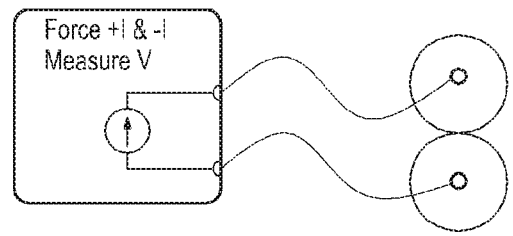
Figure 10I:
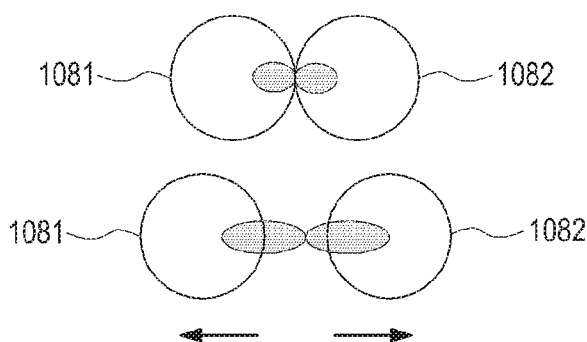

Referring to FIG. 10H, current may be applied and thus flow between the conductive cells 1081 and 1082. Referring to FIG. 10I, if the conductive cells 1081 and 1082 are brought into contact, current may flow between the conductive cells 1081 and 1082. On the contrary, if the conductive cells 1081 and 1082 are apart from each other, current does not flow between them. As illustrated in FIG. 10G, if the detection layer 1080 is stretched, there may be conductive cells 1081 and 1082 that are opened as indicated by reference numeral 1083. The processor may determine at least one of a bending point and a bending degree according to whether opening occurs between conductive cells.

FIGS. 10J to 10L are conceptual views depicting a method for determining a bending direction after a bending point is determined. Referring to FIGS. 10J to 10L, the processor may detect highly deformed areas 1091 and 1093 in detection layers 1090 and 1092. For example, the processor may detect the highly deformed areas 1091 and 1093 in various manners, as described with reference to FIGS. 10E to 10I.

Referring to FIG. 10L, the processor may determine a direction 1094 between the highly deformed area 1093 and a predetermined origin, and determine the determined direction 1094 as a bending direction.

As illustrated in FIG. 10B, apart from the TSP device 1010, a sensor unit including at least one capacitor may be included.

Meanwhile, in FIGS. 10A and 10B, the electronic device 101 includes a capacitor and a structure for acquiring a bending state based on a measured capacitance. However, these are purely exemplary embodiments. For example, those skilled in the art will readily understand that the electronic device 101 may be modified to include a resistor and determine a bending state based on a measured resistance. Because a resistance is proportional to the length of a resistor, the electronic device 101 may determine a bending state according to a resistance change. For example, the electronic device 101 may include an R-type TSP. In this case, the electronic device 101 may acquire a bending state based on a measured resistance. Or the sensor unit configured separately from the TSP device may include a resistor, as illustrated in FIG. 10B.

As described before, the electronic device 101 may determine the bending state of the flexible display in various manners, and those skilled in the art will readily understand that a method for determining the bending state of the flexible display in the electronic device 101 is not limited.

Figure 11A:
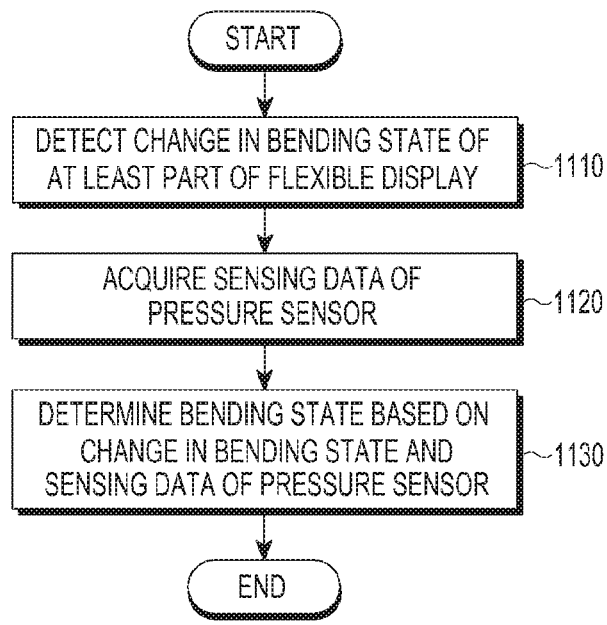
FIGS. 11A and 11B are flowcharts illustrating a moved area on a flexible display according to various embodiments of the present disclosure.
Figure 11B:
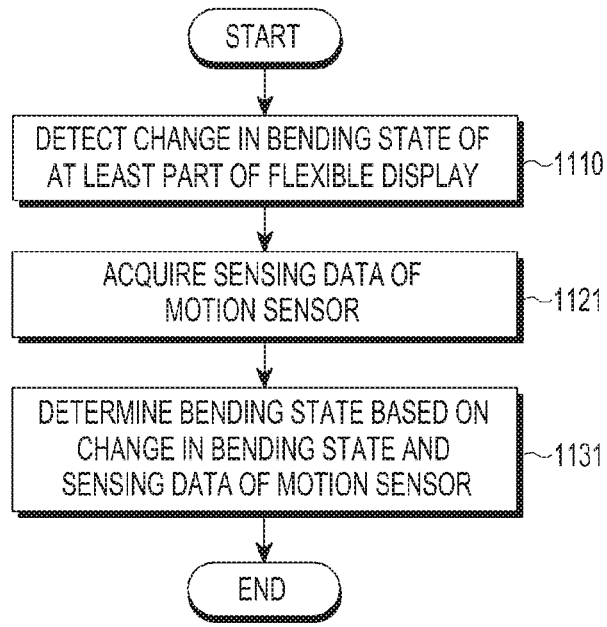

FIGS. 11A and 11B are flowcharts illustrating a moved area on a flexible display according to various embodiments of the present disclosure.

In operation 1110, the electronic device 101 may detect a bending state change in at least a part of the flexible display.

In operation 1120, the electronic device 101 may acquire sensing data from a pressure sensor. The pressure sensor may be disposed in correspondence with the position of the flexible display. More specifically, the pressure sensor may be disposed at a part to which a pressure is applied, when the flexible display is bent.

In operation 1130, the electronic device 101 may determine the bending state of the flexible display based on the bending state change and the sensing data from the pressure sensor. Particularly, the electronic device 101 may determine a moved area on the flexible display. When the user bends the electronic device 101, while grabbing the electronic device 101, the pressure sensor may sense pressures at two points In this case, a pressure sensed from a user-bent area may be larger than a pressure sensed from a stable area. The electronic device 101 may determine an area from which a relatively large pressure is sensed, to be a moved area, and an area from which a relatively small pressure is sensed, to be a stable area. In this case, the pressure sensor may be disposed on the flexible display 160 or the rear surface of the electronic device 101. Meanwhile, if the difference between the two pressures is larger than a predetermined threshold, the electronic device 101 may be configured to determine that one area has been moved. Accordingly, the instances that an electronic device 101 may determine that one area has been moved, just based on a very slight difference between the pressures is reduced; or an electronic device 101 may be prevented from determining that one area has been moved, just based on a very slight difference between the two pressures. Further, if the difference between the two pressures is equal to or less than the predetermined threshold, the electronic device 101 may determine that both areas have been moved.

In various embodiments of the present disclosure, the electronic device 101 may detect a pressure based on a contact area sensed from the touch panel. For example, when the user grabs the touch panel with his or her fingers, as the user applies a larger pressure, a contact area sensed from the touch panel may increase in size. Therefore, the electronic device 101 may determine a moved area on the flexible display based on the size of the sensed contact area. In this case, the electronic device 101 may not include a pressure sensor.

Referring to FIG. 11B, the electronic device 101 may detect a change in the bending state of at least a part of the flexible display in operation 1110. In operation 1121, the electronic device 101 may acquire sensing data from a motion sensor. The electronic device 101 may determine the bending state based on the change of the bending state and the sensing data from the motion sensor in operation 1131. Particularly, the electronic device 101 may determine a moved area of the flexible display. For example, the electronic device 101 may include a first motion sensor disposed in correspondence with the position of a first area of the flexible display, and a second motion sensor disposed in correspondence with the position of a second area of the flexible display. The electronic device 101 may determine a moved area using sensing data from the first and second motions sensors. Or the electronic device 101 may include one motion sensor disposed in correspondence with the position of one of the first and second areas. In this case, if sensing data from the motion sensor has a non-zero value, the electronic device 101 may determine the area to be a moved area. On the other hand, if the sensing data from the motion sensor has a substantially zero value, the electronic device 101 may determine the other area to be a moved area.

Figure 12:
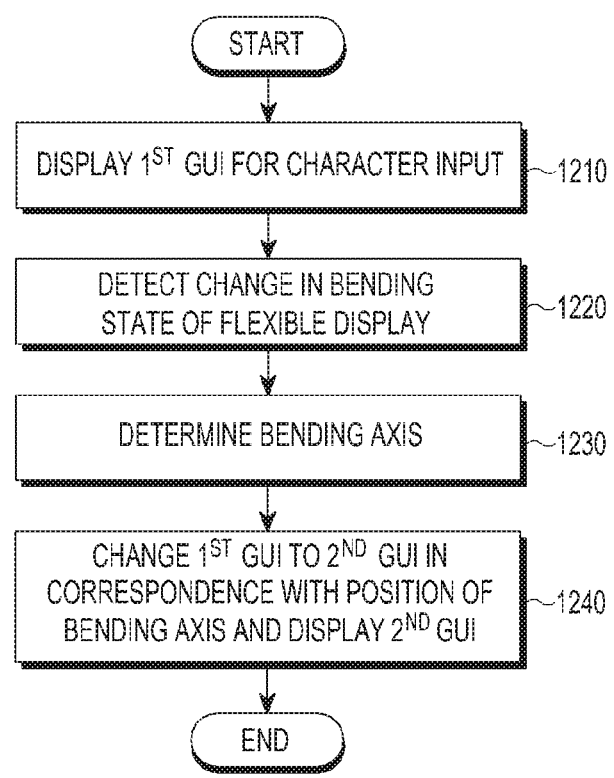
FIG. 12 is a flowchart illustrating a method for operating an electronic device according to various embodiments of the present disclosure.
Figure 13A:
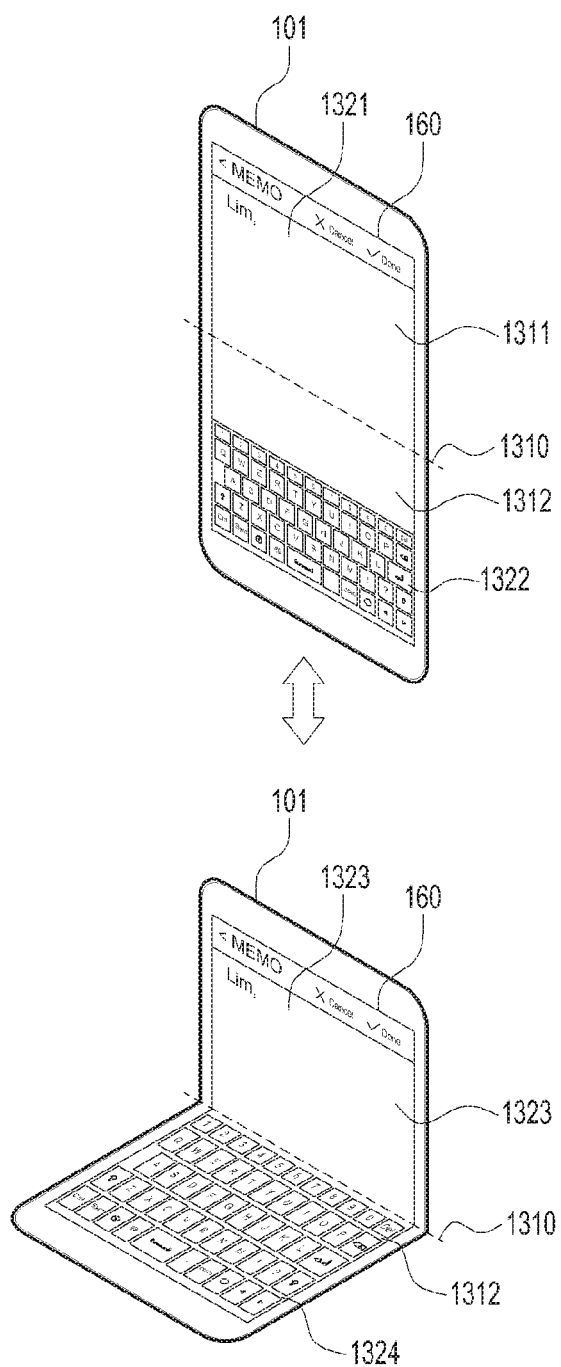
FIGS. 13A and 13B illustrate conceptual views of an electronic device according to various embodiments of the present disclosure.
Figure 13B:
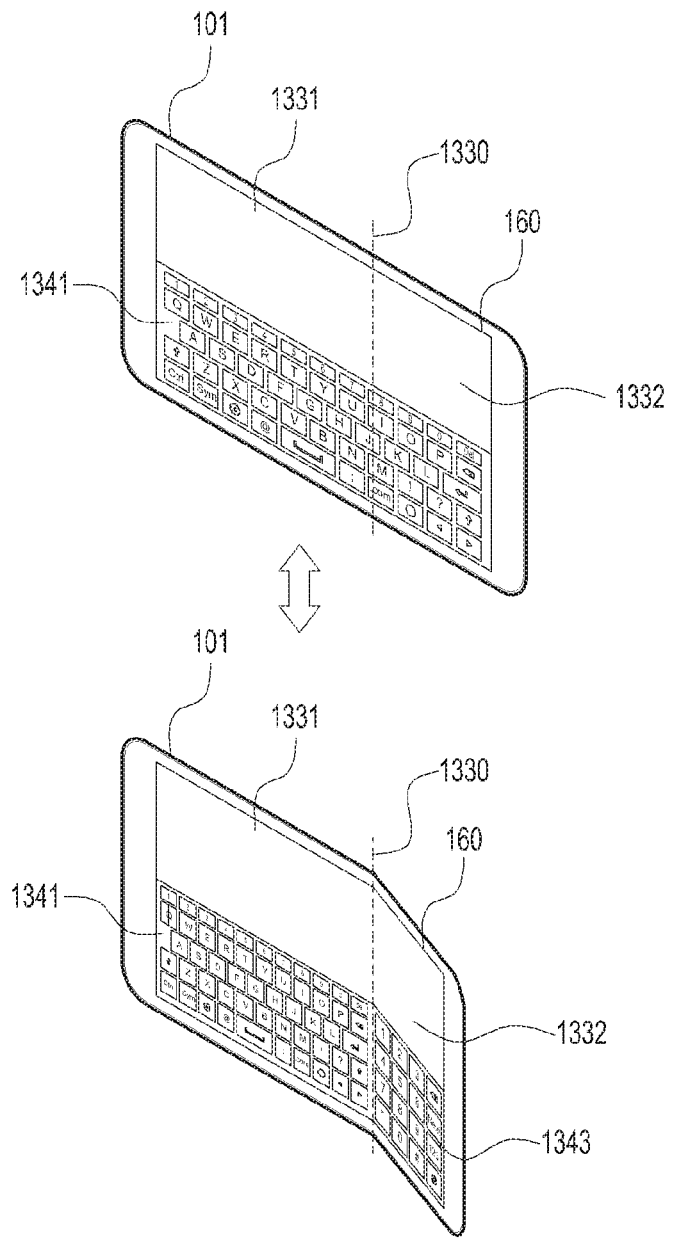

FIG. 12 is a flowchart illustrating a method for operating an electronic device according to various embodiments of the present disclosure. The embodiment of FIG. 12 will be described in detail with reference to FIGS. 13A and 13B. FIGS. 13A and 13B illustrate conceptual views of an electronic device according to various embodiments of the present disclosure.

In operation 1210, the electronic device 101 may display a first GUI for character input. For example, as illustrated in FIG. 13A, the electronic device 101 may display a memo application execution screen 1321 on the flexible display 160. The memo application execution screen 1321 may display an input character and include a first GUI 1322 for character input. The first GUI 1322 may be a keyboard of a first type (for example, a QWERTY type) and have a first size.

In operation 1220, the electronic device 101 may detect a change in the bending state of the flexible display 160. As described before, the electronic device 101 may detect a change in the bending state of the flexible display 160 in various manners. In the embodiment of FIG. 13A, the electronic device 101 may detect bending of the flexible display 160 upon a bending axis 1310. The flexible display 160 may be divided into a first area 1311 and a second area 1312 by the bending axis 1310.

In operation 1230, the electronic device 101 may determine a bending axis. As described before with reference to FIGS. 9A to 10L, the electronic device 101 may detect a change in the bending state of the flexible display 160 by detecting electrical properties of various devices. The electronic device 101 may determine a part experiencing a change in its electrical property to be the bending axis.

In operation 1240, the electronic device 101 may change the first GUI to a second GUI in correspondence with the position of the determined bending axis. For example, as illustrated in FIG. 13A, the electronic device 101 may replace the first GUI 1322 with a second GUI 1324 in correspondence with the position of the bending axis 1301 and display the second GUI 1324. Herein, the size of the second GUI 1324 may be determined according to the size of one area defined by the bending axis 1310, for example, the size of the second area 1312. The electronic device 101 may adjust a remaining part 1323 of the memo application execution screen 1321 according to the adjustment of the size of the second GUI 1324.

Referring to FIG. 13B, the electronic device 101 may display a first GUI 1341. The length of one side of the first GUI 1341 may be substantially equal to the length of one side of the flexible display 160. The electronic device 101 may detect bending of the flexible display 160 upon a bending axis 1330. The electronic device 101 may determine the position of the bending axis 1330. The flexible display 160 may be divided into a first area 1331 and a second area 1332 by the bending axis 1330.

The electronic device 101 may determine a second GUI in correspondence with the position of the bending axis 1330. The electronic device 101 may determine, as the second GUI, a first-type keyboard 1342 of a size corresponding to the size of the first area 1331 and a digit pad 1343 of a size corresponding to the size of the second area 1332.

As described before, the electronic device 101 may determine the size of the second GUI according to the size of an area defined by the bending axis 1330.

Figure 14:
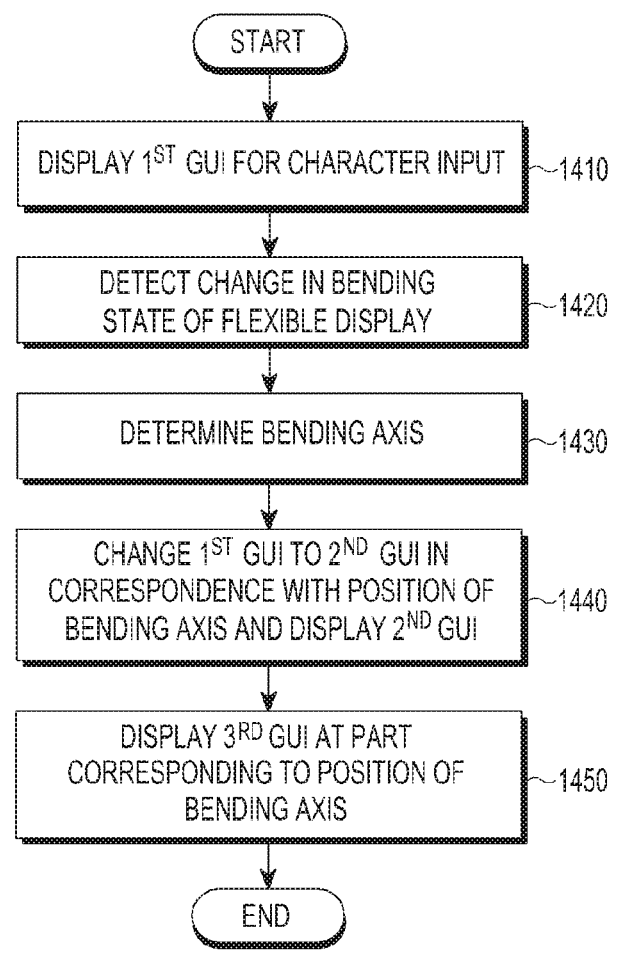
FIG. 14 is a flowchart illustrating a method for operating an electronic device according to various embodiments of the present disclosure.
Figure 15:
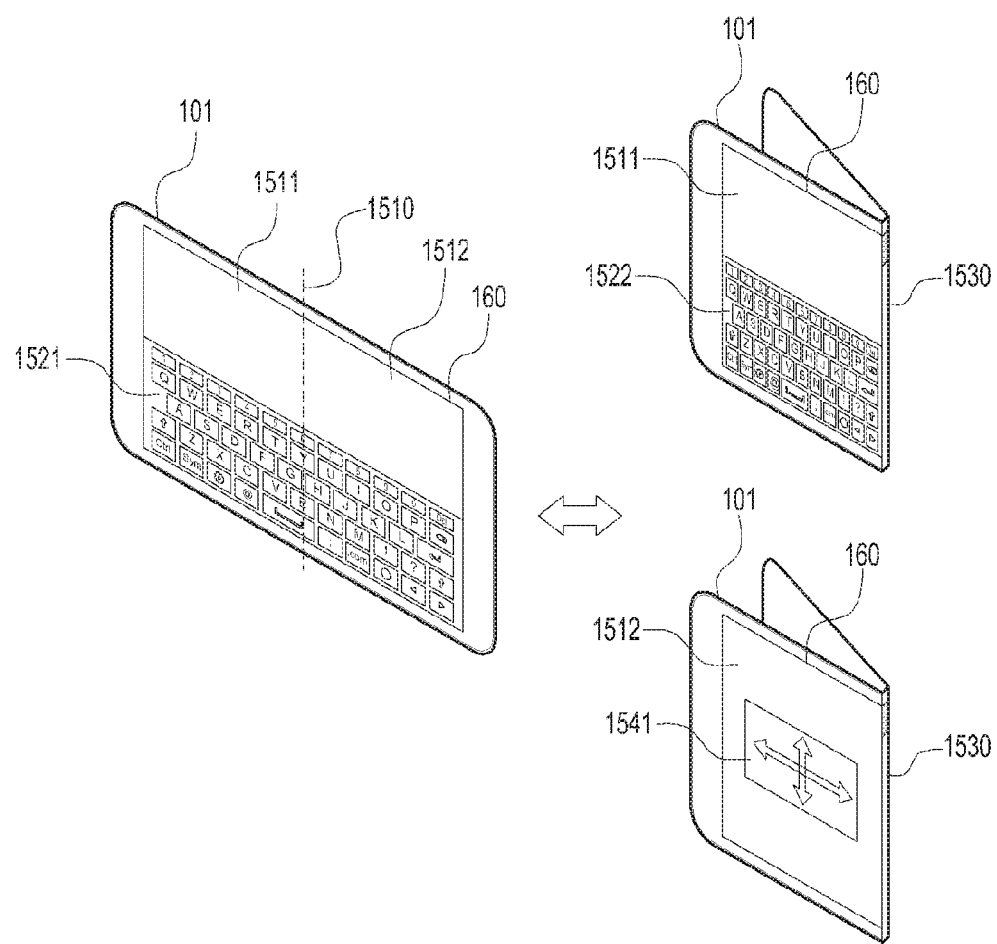
FIG. 15 illustrates a conceptual view of an electronic device according to various embodiments of the present disclosure.

FIG. 14 is a flowchart illustrating a method for operating an electronic device according to various embodiments of the present disclosure. The embodiment of FIG. 14 will be described in detail with reference to FIG. 15. FIG. 15 is a conceptual view of an electronic device according to various embodiments of the present disclosure.

In operation 1410, the electronic device 101 may display a first GUI for character input. For example, as illustrated in FIG. 15, the electronic device 101 may display a first GUI 1521 of a first type (for example, a QWERTY type). The length of one side of the first GUI 1521 may be substantially equal to the length of one side of the flexible display 160.

In operation 1420, the electronic device 101 may detect a change in the bending state of the flexible display 160. As described before, the electronic device 101 may detect bending of the flexible display 160 upon a bending axis 1510. In operation 1430, the electronic device 101 may determine the position of the bending axis 1510. In operation 1440, the electronic device 101 may change the first GUI 1521 to second GUIs 1522 and 1541 in correspondence with the position of the determined bending axis. For example, the flexible display 160 may be divided into a first area 1511 and a second area 1512 by the bending axis 1510. The electronic device 101 may display the keyboard 1522 of the first type having a size corresponding to the size of the first area 1511 in the first area 1511. The electronic device 101 may display the touch panel 1541 of a size corresponding to the size of the second area 1512 in the second area 1512. That is, the electronic device 101 may display the second GUIs 1522 and 1541 based on the position of the bending axis 1510 on the flexible display 160.

In operation 1450, the electronic device 101 may display a third GUI at a part corresponding to the position of the bending axis. As illustrated in FIG. 15, the electronic device 101 may display a third GUI 1530 at a peripheral area including the bending axis 1510. The third GUI 1530 may be configured as, but not limited to, a scroll-bar which may scroll up and down an application execution screen.

Figure 16:
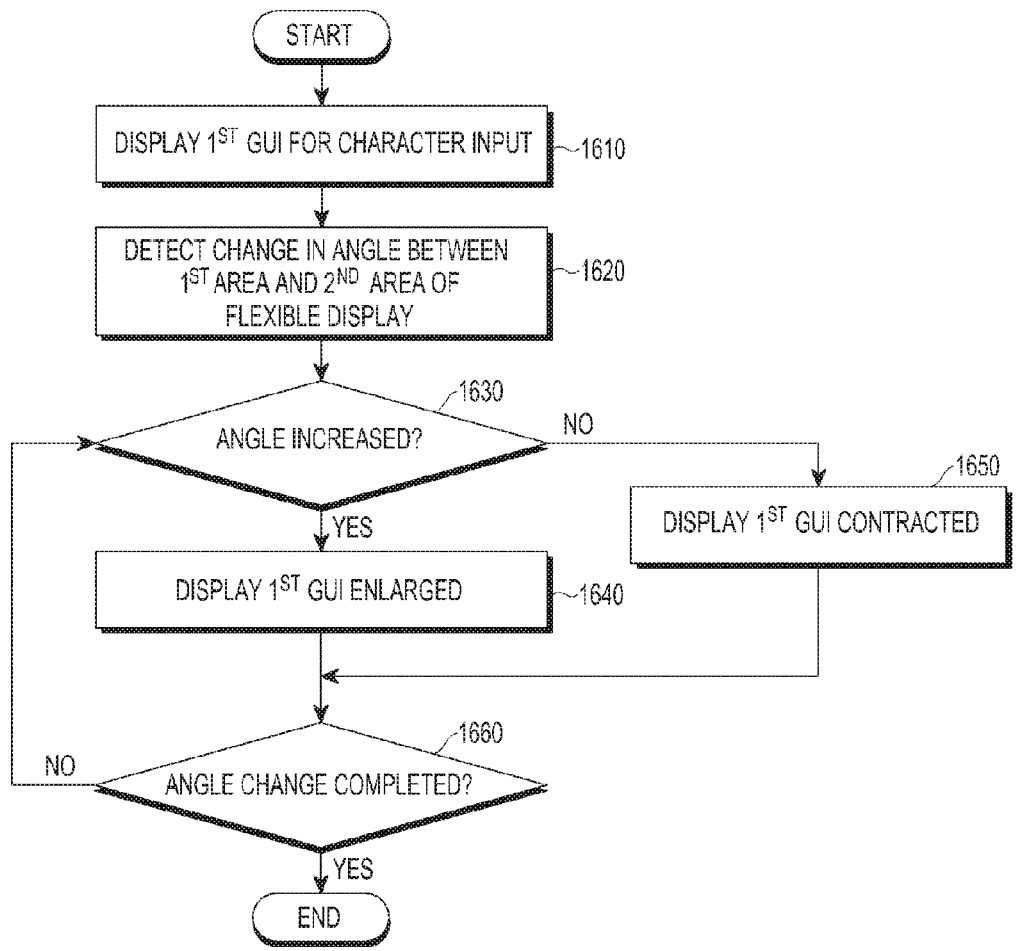
FIG. 16 is a flowchart illustrating a method for operating an electronic device according to various embodiments of the present disclosure.
Figure 17:
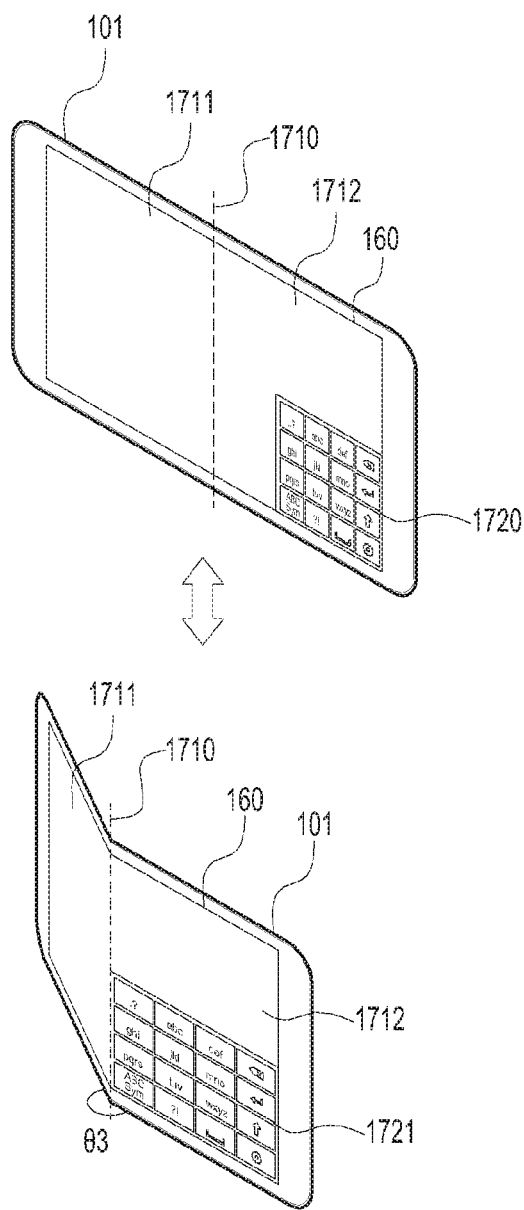
FIG. 17 illustrates a conceptual view of an electronic device according to various embodiments of the present disclosure.

FIG. 16 is a flowchart illustrating a method for operating an electronic device according to various embodiments of the present disclosure. The embodiment of FIG. 16 will be described in detail with reference to FIG. 17. FIG. 17 is a conceptual view of an electronic device according to various embodiments of the present disclosure.

In operation 1610, the electronic device 101 may display a first GUI for character input. For example, as illustrated in FIG. 17, the electronic device 101 may display a first GUI 1720 on the flexible display 160. In operation 1620, the electronic device 101 may detect a change in the angle between a first area 1711 and a second area 1712 of the flexible display 160. The electronic device 101 may detect a change in the angle between the first area 1711 and the second area 1712 from 180 degrees to θ3 with respect to the bending axis 1710.

In operation 1630, the electronic device 101 may determine whether the angle has been increased. If determining that the angle between the first and second areas 1711 and 1712 has been increased, the electronic device 101 may display the first GUI enlarged in operation 1640. As illustrated in FIG. 17, the electronic device 101 may display a second GUI 1721 obtained by enlarging the first GUI 1720.

On the other hand, if determining that the angle between the first and second areas 1711 and 1712 has been decreased, the electronic device 101 may display the first GUI contracted in operation 1650. The left and right embodiments of FIG. 17 may be reversible. Accordingly, the electronic device 101 may detect a decrease in the angle between the first and second areas 1711 and 1712 from θ3 to 180 degrees. Accordingly, the electronic device 101 may display the first GUI 1720 being a scaled-down version of the second GUI 1721.

In operation 1660, the electronic device 101 may determine whether the angle change has been completed. The electronic device 101 may adjust the size of the GUI until before completion of the angle change.

Figure 18:
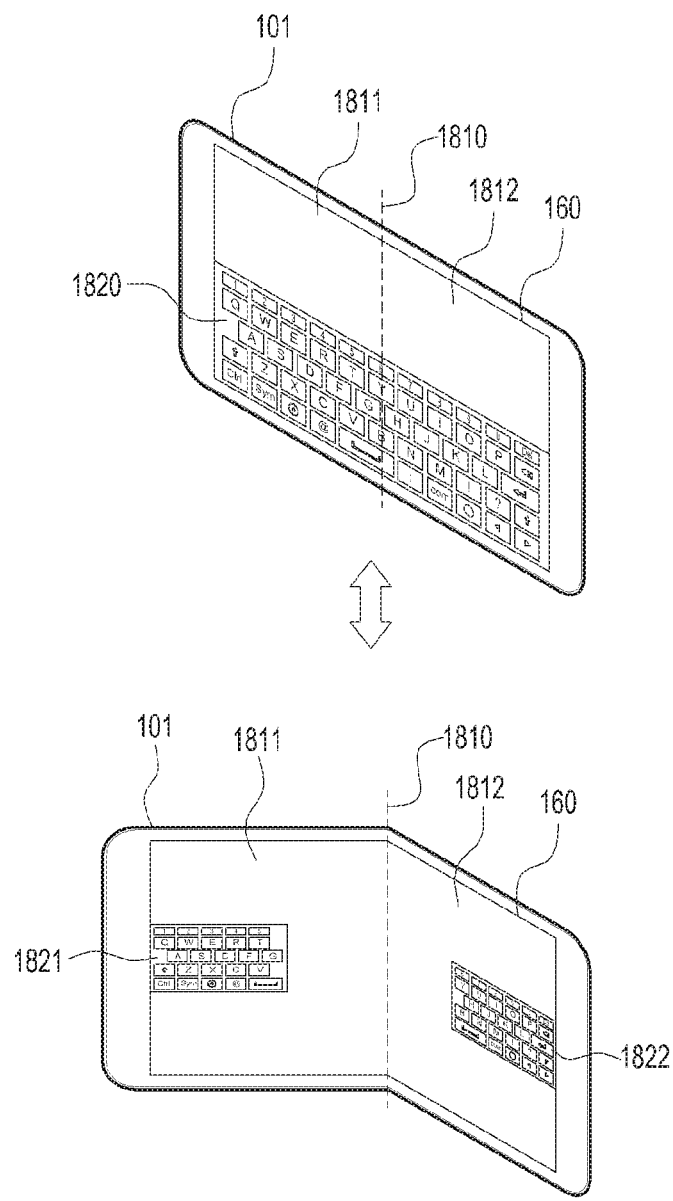
FIG. 18 illustrates a conceptual view of a graphic user interface (GUI) according to various embodiments of the present disclosure.

FIG. 18 is a conceptual view referred for describing GUIs according to various embodiments of the present disclosure.

Referring to FIG. 18, the electronic device 101 may detect a change in the bending state of the flexible display 160. For example, the electronic device 101 may detect inward bending of the flexible display 160 with respect to a bending axis 1810. The electronic device 101 may change a first GUI 1820 to second GUIs 1821 and 1822 in correspondence with the change of the bending state of the flexible display 160, and display the second GUIs 1821 and 1822. The second GUIs 1821 and 1822 may be segments of the first GUI 1820. The electronic device 101 may display the keyboard segments 1821 and 1822 respectively in first and second areas 1811 and 1812 defined by the bending axis 1810. The second GUIs 1821 and 1822 may be disposed at default positions. That is, the electronic device 101 may display the second GUIs 1821 and 1822 obtained by adjusting the shape of the first GUI 1820.

Figure 19:
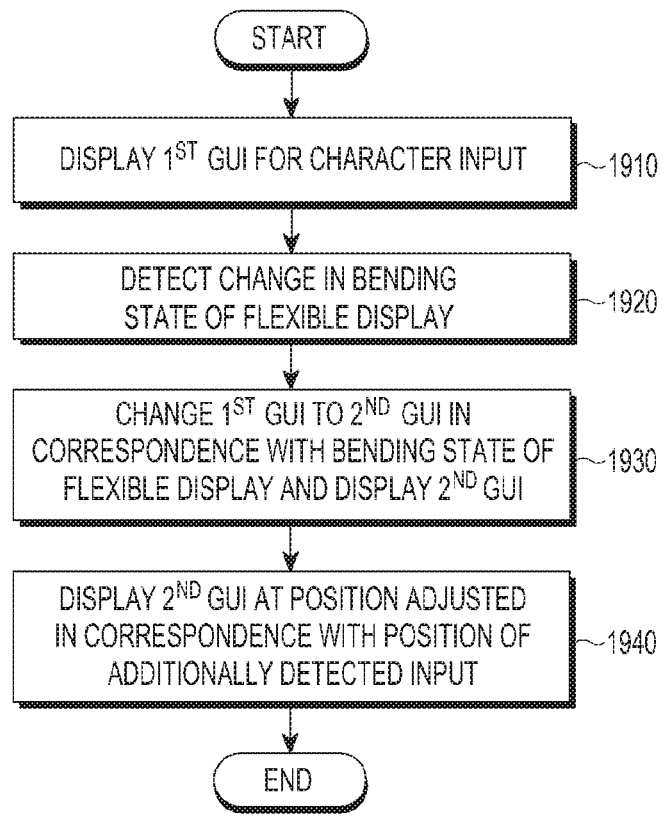
FIG. 19 is a flowchart illustrating a method for operating an electronic device according to various embodiments of the present disclosure.
Figure 20:
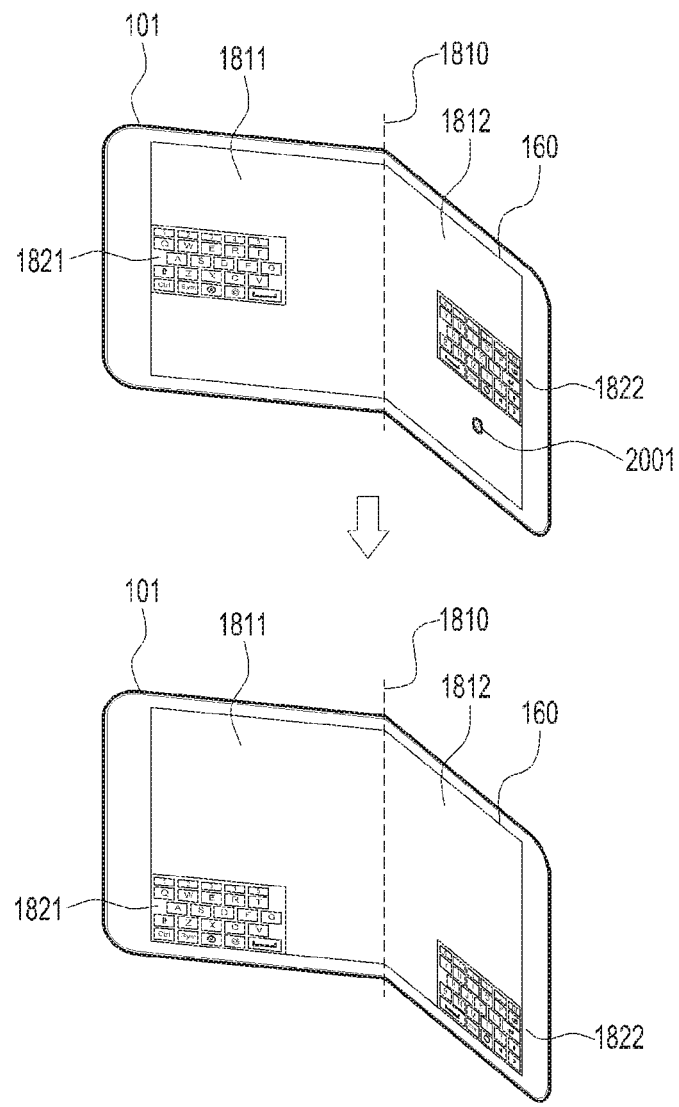
FIG. 20 illustrates a conceptual view of an electronic device according to various embodiments of the present disclosure.

FIG. 19 is a flowchart illustrating a method for operating an electronic device according to various embodiments of the present disclosure. The embodiment of FIG. 19 will be described in detail with reference to FIG. 20. FIG. 20 is a conceptual view of an electronic device according to various embodiments of the present disclosure. The embodiment of FIG. 20 describes the electronic device after the operation in the embodiment of FIG. 18.

In operation 1910, the electronic device 101 may display a first GUI for character input. As illustrated in FIG. 18, the electronic device 101 may display a first GUI 1820. In operation 1920, the electronic device 101 may detect a change in the bending state of the flexible display 160. In operation 1930, the electronic device 101 may change the first GUI 1820 to second GUIs 1821 and 1822 in correspondence with the change of the bending state of the flexible display 160, and display the second GUIs 1821 and 1822. For example, as illustrated in FIG. 20, the electronic device 101 may display the two half keyboard segments 1821 and 1822. As described before with reference to FIG. 18, the second GUIs 1821 and 1822 may disposed at default positions.

In operation 1940, the electronic device 101 may adjust the positions of the second GUIs 1821 and 1822 in correspondence with the position of a position change input 2001 which has been further detected, and display the second GUIs 1821 and 1822 at the adjusted positions. As illustrated in FIG. 20, the electronic device 101 may further detect the position change input 2001 and display the second GUIs 1821 and 1822 at positions adjusted in correspondence with the detected position change input 2001. While the position change input 2001 is shown in FIG. 20 as a touch input, this is purely exemplary and thus the type of the position change input is not limited.

Figure 21:
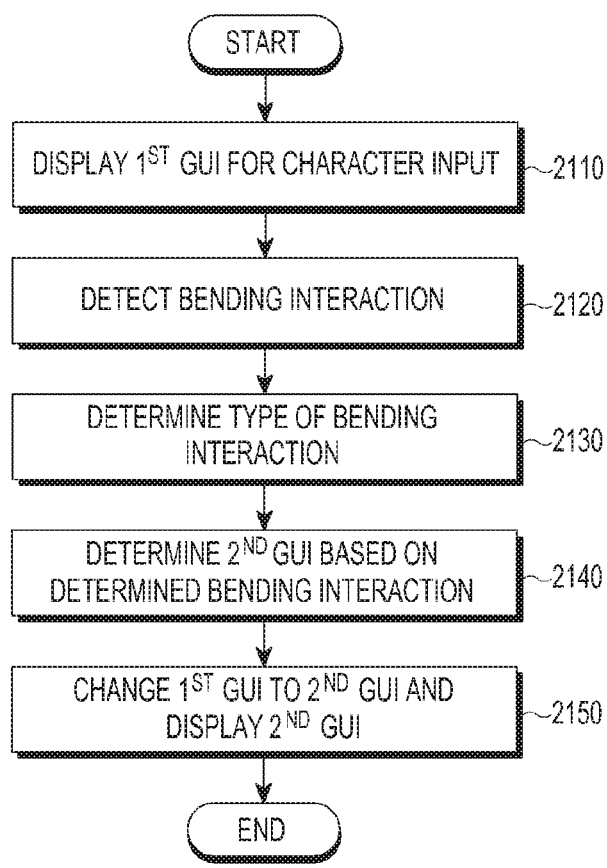
FIG. 21 is a flowchart illustrating a method for operating an electronic device according to various embodiments of the present disclosure.

FIG. 21 is a flowchart illustrating a method for operating an electronic device according to various embodiments of the present disclosure.

In operation 2110, the electronic device 101 may display a first GUI for character input. In operation 2120, the electronic device 101 may detect a bending interaction. The bending interaction may mean bending of the flexible display. In operation 2130, the electronic device 101 may determine the type of the bending interaction. The electronic device 101 may pre-store various types of bending interactions. The electronic device 101 may pre-store association information between bending interaction types and second GUIs.

In operation 2140, the electronic device 101 may determine a second GUI based on the determined bending interaction. In operation 2150, the electronic device 101 may change the first GUI to the second GUI and display the second GUI.

FIGS. 22A to 22E are conceptual views of exemplary bending interactions according to various embodiments of the present disclosure. For the convenience of description, only the flexible display is shown in FIGS. 22A to 22E.

Figure 22A:
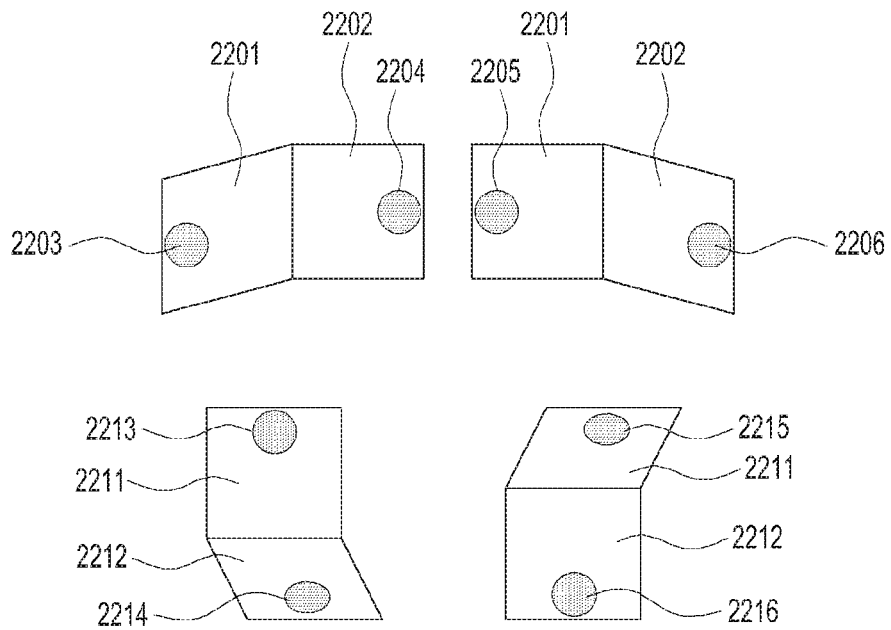
FIGS. 22A to 22E illustrate conceptual views of various exemplary bending interactions according to various embodiments of the present disclosure.

Referring to FIG. 22A, first and second areas 2201 and 2202 of the flexible display may be bent sideways upon a bending axis. The first area 2201 may move inward and the second area 2202 may be stable. As described before, the electronic device 101 may detect a pressure 2203 at a point of the first area 2201 and a pressure 2204 at a point of the second area 2202, and the pressure 2203 may be greater than the pressure 2204. As the first area 2201 moves, the electronic device 101 may detect a bending interaction which is inward bending of the flexible display, and display a second GUI corresponding to the bending interaction.

Or the second 2202 may move inward and the first area 2201 may be stable. As described before, the electronic device 101 may detect a pressure 2205 at a point of the first area 2201 and a pressure 2206 at a point of the second area 2202, and the pressure 2206 may be greater than the pressure 2205. As the second area 2202 moves, the electronic device 101 may detect a bending interaction which is inward bending of the flexible display, and display a second GUI corresponding to the bending interaction.

Or third and fourth areas 2211 and 2212 of the flexible display may be bent upward and downward upon a bending axis. The fourth area 2212 may move inward and the third area 2211 may be stable. As described before, the electronic device 101 may detect a pressure 2213 at a point of the third area 2211 and a pressure 2214 at a point of the fourth area 2212, and the pressure 2214 may be greater than the pressure 2213. As the fourth area 2212 moves, the electronic device 101 may detect a bending interaction which is inward bending of the flexible display, and display a second GUI corresponding to the bending interaction.

Or the third area 2211 may move inward and the fourth area 2212 may be stable. As described before, the electronic device 101 may detect a pressure 2215 at a point of the third area 2211 and a pressure 2216 at a point of the fourth area 2212, and the pressure 2215 may be greater than the pressure 2216. As the third area 2211 moves, the electronic device 101 may detect a bending interaction which is inward bending of the flexible display, and display a second GUI corresponding to the bending interaction.

As described above, the electronic device 101 may detect a bending interaction of inward bending of one area of the flexible display, and display a GUI corresponding to the bending interaction.

Figure 22B:
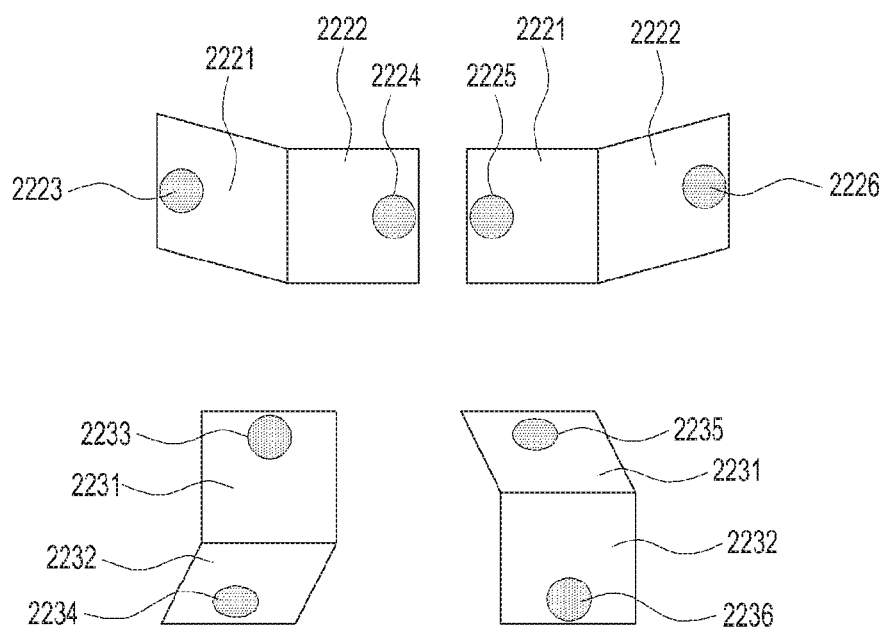

Referring to FIG. 22B, the first and second areas 2221 and 2222 of the flexible display may be bent sideways upon the bending axis. The first area 2221 may move outward and the second area 2222 may be stable. As described before, the electronic device 101 may detect the pressure 2223 at a point of the first area 2221 and the pressure 2224 at a point of the second area 2222, and the pressure 2223 may be greater than the pressure 2224. As the first area 2221 moves, the electronic device 101 may detect a bending interaction which is outward bending of the flexible display, and display a second GUI corresponding to the bending interaction.

Or the second 2222 may move outward and the first area 2221 may be stable. As described before, the electronic device 101 may detect the pressure 2225 at a point of the first area 2221 and the pressure 2226 at a point of the second area 2222, and the pressure 2226 may be greater than the pressure 2225. As the second area 2222 moves, the electronic device 101 may detect a bending interaction which is outward bending of the flexible display, and display a second GUI corresponding to the bending interaction.

Or the third and fourth areas 2231 and 2232 of the flexible display may be bent upward and downward upon the bending axis. The fourth area 2232 may move outward and the third area 2231 may be stable. As described before, the electronic device 101 may detect the pressure 2233 at a point of the third area 2231 and the pressure 2234 at a point of the fourth area 2232, and the pressure 2234 may be greater than the pressure 2233. As the fourth area 2232 moves, the electronic device 101 may detect a bending interaction which is outward bending of the flexible display, and display a second GUI corresponding to the bending interaction.

Or the third area 2231 may move outward and the fourth area 2232 may be stable. As described before, the electronic device 101 may detect the pressure 2235 at a point of the third area 2231 and the pressure 2236 at a point of the fourth area 2232, and the pressure 2235 may be greater than the pressure 2246. As the third area 2231 moves, the electronic device 101 may detect a bending interaction which is outward bending of the flexible display, and display a second GUI corresponding to the bending interaction.

As described above, the electronic device 101 may detect a bending interaction which is outward bending of one area of the flexible display and display a GUI corresponding to the bending interaction.

Figure 22C:
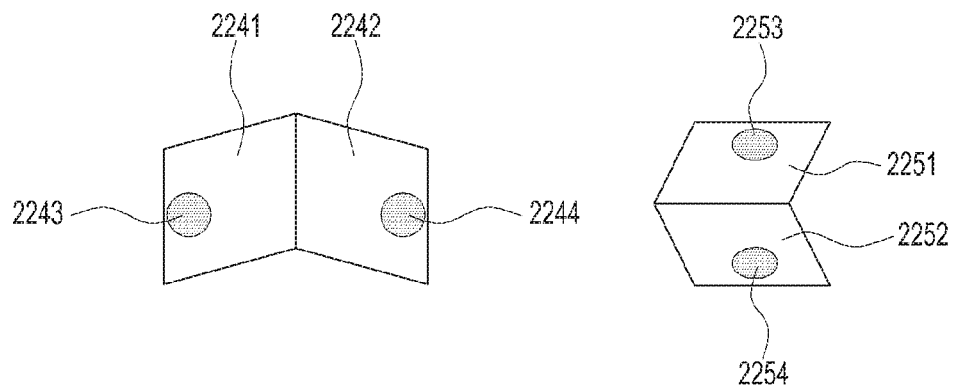

Referring to FIG. 22C, first and second areas 2241 and 2242 of the flexible display may be bent sideways upon a bending axis. Both the first area 2241 and the second area 2242 may move inward. As described before, the electronic device 101 may detect a pressure 2243 at a point of the first area 2241 and a pressure 2244 at a point of the second area 2242, and the difference between the pressure 2243 and the pressure 2244 may be less than a predetermined threshold. If the difference between the pressure 2243 and the pressure 2244 is less than the predetermined threshold, the electronic device 101 may detect that the bending interaction is inward movement of both areas 2241 and 2242. The electronic device 101 may display a second GUI corresponding to the bending interaction.

Or third and fourth areas 2251 and 2252 of the flexible display may be bent upward and downward upon a bending axis. Both the third area 2251 and the fourth area 2252 may move. As described before, the electronic device 101 may detect a pressure 2253 at a point of the third area 2251 and a pressure 2254 at a point of the fourth area 2252, and the difference between the pressure 2253 and the pressure 2254 is less than a predetermined threshold. If the difference between the pressure 2253 and the pressure 2254 is less than the predetermined threshold, the electronic device 101 may detect that the bending interaction is inward movement of both areas 2251 and 2252. The electronic device 101 may display a second GUI corresponding to the bending interaction.

Figure 22D:
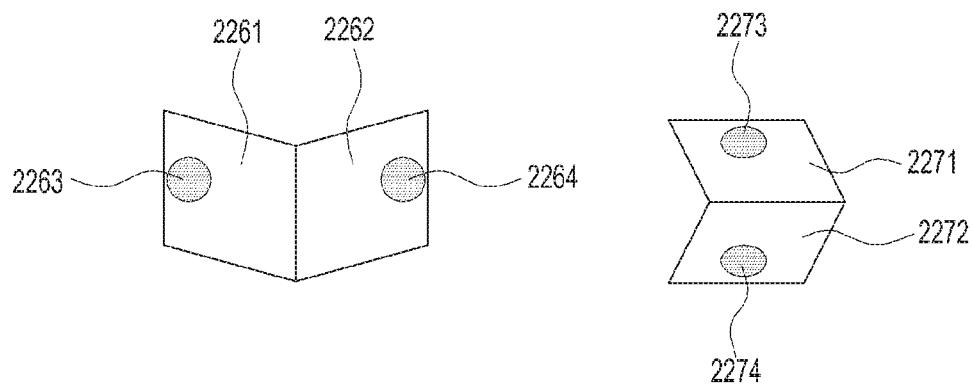

Referring to FIG. 22D, first and second areas 2261 and 2262 of the flexible display may be bent sideways upon a bending axis. Both the first area 2261 and the second area 2262 may move outward. As described before, the electronic device 101 may detect a pressure 2263 at a point of the first area 2261 and a pressure 2264 at a point of the second area 2262, and the difference between the pressure 2263 and the pressure 2264 may be less than a predetermined threshold. If the difference between the pressure 2263 and the pressure 2264 is less than the predetermined threshold, the electronic device 101 may detect that the bending interaction is outward movement of both areas 2261 and 2262. The electronic device 101 may display a second GUI corresponding to the bending interaction.

Or third and fourth areas 2271 and 2272 of the flexible display may be bent upward and downward upon a bending axis. Both the third area 2271 and the fourth area 2272 may move. As described before, the electronic device 101 may detect a pressure 2273 at a point of the third area 2271 and a pressure 2274 at a point of the fourth area 2272, and the difference between the pressure 2273 and the pressure 2274 is less than a predetermined threshold. If the difference between the pressure 2273 and the pressure 2274 is less than the predetermined threshold, the electronic device 101 may detect that the bending interaction is outward movement of both areas 2271 and 2272. The electronic device 101 may display a second GUI corresponding to the bending interaction.

Figure 22E:
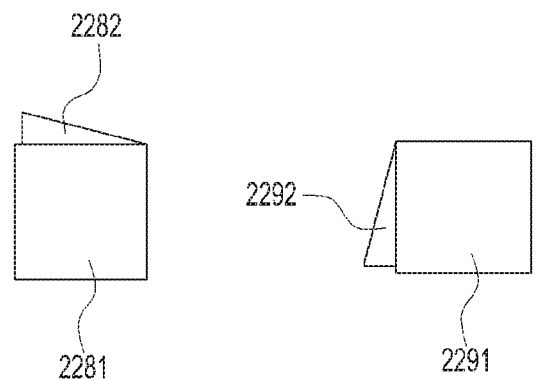

Referring to FIG. 22E, first and second areas 2281 and 2282 of the flexible display may be bent sideways upon a bending axis. The electronic device 101 may detect that the angle between the first and second areas 2281 and 2282 is less than a predetermined threshold, and detect a sideways folding interaction as a bending interaction based on the angle. The electronic device 101 may display a second GUI corresponding to the bending interaction.

Meanwhile, third and fourth areas 2291 and 2292 of the flexible display may be bent upward and downward upon a bending axis. The electronic device 101 may detect that the angle between the third and fourth areas 2291 and 2292 is less than a predetermined threshold, and detect an up-down folding interaction as a bending interaction based on the angle. The electronic device 101 may display a second GUI corresponding to the bending interaction.

According to various embodiments of the present disclosure, a method for operating an electronic device having a flexible display may include displaying a first GUI for character input on the flexible display, detecting a change in a bending state of the flexible display, and changing the first GUI to a second GUI in correspondence with the change of the bending state of the flexible display, and displaying the second GUI.

According to various embodiments of the present disclosure, the changing of the first GUI to a second GUI and displaying of the second GUI may include detecting a change in an angle between a first area and a second area of the flexible display, and displaying a second GUI corresponding to the angle between the first area and the second area.

According to various embodiments of the present disclosure, the changing of the first GUI to a second GUI and displaying of the second GUI may include determining a moved area among the first area and the second area, and displaying the second GUI based on the determined moved area and the angle between the first area and the second area.

According to various embodiments of the present disclosure, the determination of a moved area may include detecting a first pressure corresponding to the first area and detecting a second pressure corresponding to the second area, and determining the moved area based on the first pressure and the second pressure.

According to various embodiments of the present disclosure, the determination of the moved area based on the first pressure and the second pressure may include, if the difference between the first pressure and the second pressure is larger than a predetermined threshold, determining an area corresponding to a larger pressure between the first pressure and the second pressure to be the moved area.

According to various embodiments of the present disclosure, the determination of the moved area based on the first pressure and the second pressure may include, if the difference between the first pressure and the second pressure is equal to or less than a predetermined threshold, determining that both the first area and second area have moved.

According to various embodiments of the present disclosure, the determination of a moved area may include determining the moved area based on at least one of sensing data from a first motion sensor disposed in correspondence with the position of the first area and sensing data from a second motion sensor disposed in correspondence with the position of the second area.

According to various embodiments of the present disclosure, the changing of the first GUI to a second GUI and displaying of the second GUI may include, if it is determined that the angle between the first area and the second area has increased, displaying the second GUI in a larger size than the first GUI, and if it is determined that the angle between the first area and the second area has decreased, displaying the second GUI in a smaller size than the first GUI.

According to various embodiments of the present disclosure, the detection of a change in a bending state of the flexible display may include determining a position of a bending axis upon which the flexible display is bent, and the changing of the first GUI to a second GUI and displaying of the second GUI may include displaying the second GUI based on the position of the bending axis.

According to various embodiments of the present disclosure, the changing of the first GUI to a second GUI and displaying of the second GUI may include determining a size of the second GUI in correspondence with a size of a part of the flexible display defined by the bending axis.

According to various embodiments of the present disclosure, the method may further include displaying a third GUI in a third area of the flexible display corresponding to the position of the bending axis.

According to various embodiments of the present disclosure, the method may further include receiving a position change input for the second GUI, and changing a position of the second GUI in correspondence with the received position change input, and displaying the second GUI at the changed position.

According to various embodiments of the present disclosure, the changing of the first GUI to a second GUI and displaying of the second GUI may include reading association information between the change of the bending state and the second GUI, and displaying the second GUI based on the read association information.

According to various embodiments of the present disclosure, the second GUI may be of the same type as the first GUI and has a different size from the first GUI, or the second GUI may be of a different type from the first GUI or in a shape obtained by modifying a shape of the first GUI.

Each of the above-described components of the electronic device may include one or more parts and the name of the component may vary with the type of the electronic device. According to various embodiments, the electronic device may be configured to include at least one of the afore-described components. Some component may be omitted from or added to the electronic device. According to various embodiments, one entity may be configured by combining a part of the components of the electronic device, to thereby perform the same functions of the components prior to the combining.

The term "module" as used herein may refer to a unit including one or a combination of two or more of hardware, software, and firmware. The term "module" may be used interchangeably with terms such as, for example, unit, logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

The computer-readable medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, read-only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

According to various embodiments of the present disclosure, a storage medium may store instructions configured to, when executed by at least one processor, control the at least one processor to perform at least one operation. The at least one operation may include displaying a first GUI for character input on the flexible display, detecting a change in a bending state of the flexible display, and changing the first GUI to a second GUI in correspondence with the change of the bending state of the flexible display, and displaying the second GUI.

As is apparent from the foregoing description, an electronic device and a method for operating the electronic device, which can change a GUI for character input in correspondence with a change in the shape of a flexible display and display the changed GUI, can be provided. Therefore, even though the shape of the flexible display is changed, a GUI that enables input optimization can be selected in correspondence with the changed shape of the flexible display, and displayed on the flexible display.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device having a flexible display, the method comprising:
   displaying a first graphic user interface (GUI) for character input on a first part of an execution screen of an application on the flexible display, wherein a length of one side of the first GUI for character input is equal to a length of one side of the flexible display;
   detecting a first angle between a first area and a second area of the flexible display;
   selecting a second GUI for character input corresponding to the first angle between the first area and the second area from among a plurality of GUIs for character input based on pre-stored association information between angles between the first area and the second area and the plurality of GUIs for the character input, wherein a length of one side of the second GUI for character input is equal to the length of the second area;
   displaying the second GUI for character input on a second part of the execution screen of the application on the flexible display;
   detecting a second angle between the first area and the second area of the flexible display;
   selecting a third GUI for character input corresponding to the second angle between the first area and the second area from among the plurality of GUIs for character input based on the pre-stored association information, the third GUI being different from the second GUI for character input, wherein the third GUI for character input is a same type as the second GUI and has a smaller size than the second GUI for character input; and
   displaying the third GUI for character input on a third part of the execution screen of the application on the flexible display.

2. The method of claim 1, wherein displaying the second GUI comprises:
   determining a moved area among the first area and the second area; and
   displaying the second GUI for character input based on the determined moved area and the first angle between the first area and the second area.

3. The method of claim 2, wherein determining the moved area comprises:
   detecting a first pressure corresponding to the first area and detecting a second pressure corresponding to the second area; and
   determining the moved area based on the first pressure and the second pressure.

4. The method of claim 3, wherein determining the moved area based on the first pressure and the second pressure comprises:
   in response to a difference between the first pressure and the second pressure being larger than a predetermined threshold, determining an area corresponding to a larger pressure between the first pressure and the second pressure as the moved area.

5. The method of claim 3, wherein determining the moved area based on the first pressure and the second pressure comprises:
   in response to a difference between the first pressure and the second pressure being equal to or less than a predetermined threshold, determining that both the first area and the second area have moved.

6. The method of claim 2, wherein determining the moved area comprises determining the moved area based on at least one of:
   sensing data from a first motion sensor disposed in correspondence with a first position of the first area, or
   sensing data from a second motion sensor disposed in correspondence with a second position of the second area.

7. The method of claim 1, wherein displaying the second GUI for character input comprises:
   in response to detecting that the first angle between the first area and the second area is larger than a previous angle corresponding to the first GUI for character input, displaying the second GUI for character input in a larger size than the first GUI for character input; and
   in response to detecting that the first angle between the first area and the second area is smaller than the previous angle corresponding to the first GUI for character input, displaying the second GUI for character input in a smaller size than the first GUI for character input.

8. The method of claim 1, wherein the method further comprises:
   determining a position of a bending axis upon which the flexible display is bent;
   changing the first GUI to the second GUI for character input is based on the position of the bending axis; and
   displaying the second GUI for character input based on the position of the bending axis.

9. The method of claim 8, wherein changing the first GUI for character input to the second GUI for character input comprises determining a size of the second GUI for character input in correspondence with a size of a part of the flexible display defined by the bending axis.

10. The method of claim 8, wherein displaying the third GUI for character input comprising displaying the third GUI for character input on a third part of the execution screen of the application on the flexible display based on the position of the bending axis.

11. The method of claim 1, further comprising:
receiving a position change input for changing a position of the second GUI for character input; and
displaying the second GUI for character input at the changed position in correspondence with the received position change input.

12. The method of claim 1, wherein the second GUI for character input is at least one of
a same type as the first GUI for character input and has a different size than that of the first GUI for character input,
a different type than that of the first GUI for character input, or
in a shape different than that of the first GUI for character input, obtained by modifying the shape of the first GUI for character input.

13. An electronic device comprising:
a flexible display;
a memory configured to store one or more instructions; and
a processor connected electrically to the flexible display and to the memory, wherein the processor, upon execution of the stored one or more instructions, is configured to:
control the flexible display to display a first graphic user interface (GUI) for character input on a first part of an execution screen of an application, wherein a length of one side of the first GUI for character input is equal to a length of one side of the flexible display,
detect a first angle between a first area and a second area of the flexible display,
select a second GUI for character input corresponding to the first angle between the first area and the second area from among a plurality of GUIs for character input based on pre-stored association information between angles between the first area and the second area and the plurality of GUIs for character input for the character input, wherein a length of one side of the second GUI for character input is equal to the length of the second area,
control the flexible display to display the second GUI for character input on a second part of the execution screen of the application,
detect a second angle between the first area and the second area of the flexible display,
select a third GUI for character input corresponding to the second angle between the first area and the second area from among the plurality of GUIs for character input based on the pre-stored association information, the third GUI for character input being different from the second GUI for character input, wherein the third GUI for character input is a same type as the second GUI for character input and has a smaller size than the second GUI for character input, and
control the flexible display to display the third GUI for character input on a third part of the execution screen of the application on the flexible display.

14. The electronic device of claim 13, wherein the processor is configured to:
determine a moved area among the first area and the second area, and
display the second GUI for character input based on the determined moved area and the detected change in the first angle between the first area and the second area.

15. The electronic device of claim 14, further comprising a pressure sensor configured to:
detect a first pressure corresponding to the first area and a second pressure corresponding to the second area, and
determine the moved area based on the detected first pressure and the detected second pressure.

16. The electronic device of claim 15, wherein the processor is configured to:
in response to a difference between the first pressure and the second pressure being larger than a predetermined threshold, determine an area corresponding to a larger pressure between the first pressure and the second pressure as the moved area.

17. The electronic device of claim 15, wherein the processor is configured to:
in response to a difference between the first pressure and the second pressure being equal to or less than a predetermined threshold, determine that both the first area and the second area have moved.

* * * * *